United States Patent
Lee

(10) Patent No.: US 9,646,384 B2
(45) Date of Patent: May 9, 2017

(54) 3D FEATURE DESCRIPTORS WITH CAMERA POSE INFORMATION

(71) Applicant: Motorola Mobility LLC, Libertyville, IL (US)

(72) Inventor: Johnny C Lee, Mountain View, CA (US)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 0 days.

(21) Appl. No.: 14/040,918

(22) Filed: Sep. 30, 2013

(65) Prior Publication Data
US 2015/0071524 A1    Mar. 12, 2015

Related U.S. Application Data

(60) Provisional application No. 61/876,445, filed on Sep. 11, 2013.

(51) Int. Cl.
| | | |
|---|---|---|
| *G06K 9/00* | (2006.01) | |
| *G06T 7/00* | (2017.01) | |
| *G06K 9/46* | (2006.01) | |

(52) U.S. Cl.
CPC ........ *G06T 7/0075* (2013.01); *G06K 9/00208* (2013.01); *G06K 9/4671* (2013.01); *G06T 7/0042* (2013.01); *G06T 2207/10012* (2013.01)

(58) Field of Classification Search
CPC ......... G06T 7/0075; G06T 2207/10012; G06T 2207/10016; G06K 9/6202; G06K 9/3241
(Continued)

(56) References Cited

U.S. PATENT DOCUMENTS

| 6,215,519 B1 | 4/2001 | Nayar et al. |
| 6,611,283 B1 | 8/2003 | Isonuma |

(Continued)

FOREIGN PATENT DOCUMENTS

| EP | 1594322 A2 | 9/2005 |
| EP | 2533541 A1 | 12/2012 |

(Continued)

OTHER PUBLICATIONS

Pan et al: "Rapid scene reconstruction on mobile phones from panoramic images", IEEE, 2011.*

(Continued)

*Primary Examiner* — Ruiping Li

(57) ABSTRACT

A method includes determining a first two-dimensional (2D) feature descriptor from a first image captured by an imaging camera in a first pose at a time of capture of the first image, the first pose including a first observation direction of the imaging camera. The method further includes storing, at an electronic device, a 3D feature descriptor including the first 2D feature descriptor and a representation of the first pose of the imaging camera. The method additionally includes determining a second 2D feature descriptor from a second image captured by the imaging camera in a second pose at a time of capture of the second image, the second pose including a second observation direction of the imaging camera. The method also includes storing the 3D feature descriptor with the second 2D feature descriptor and a representation of the second pose of the imaging camera.

14 Claims, 11 Drawing Sheets

(58) Field of Classification Search
USPC .................. 382/154, 103, 218, 165, 285
See application file for complete search history.

(56) References Cited

U.S. PATENT DOCUMENTS

| | | | |
|---|---|---|---|
| 6,700,604 | B1 | 3/2004 | Murata et al. |
| 7,996,097 | B2 | 8/2011 | Dibernardo et al. |
| 8,072,470 | B2 | 12/2011 | Marks |
| 8,295,955 | B2 | 10/2012 | Dibernardo et al. |
| 8,452,081 | B2 | 5/2013 | Wang |
| 2007/0262884 | A1* | 11/2007 | Goncalves et al. ...... 340/995.24 |
| 2009/0092335 | A1 | 4/2009 | Kim et al. |
| 2009/0315978 | A1 | 12/2009 | Wurmlin et al. |
| 2009/0322891 | A1 | 12/2009 | Kondo et al. |
| 2011/0234758 | A1 | 9/2011 | Tsuboi et al. |
| 2011/0298892 | A1 | 12/2011 | Baer |
| 2012/0194644 | A1 | 8/2012 | Newcombe et al. |
| 2012/0228083 | A1 | 9/2012 | Terzini |
| 2012/0293633 | A1 | 11/2012 | Yamato |
| 2013/0010087 | A1 | 1/2013 | Nieten et al. |
| 2013/0136300 | A1 | 5/2013 | Wagner et al. |

FOREIGN PATENT DOCUMENTS

| | | | |
|---|---|---|---|
| WO | 2009069071 | A1 | 6/2009 |
| WO | 2011047888 | A1 | 4/2011 |

OTHER PUBLICATIONS

Klein et al: "Parallel tracking and mapping for small AR workspaces", IEEE, 2007.*

Herling et al: "An adaptive training free feature tracker for mobile phones", ACM, 2010.*

Patric Jensfelt et al., "A Framework for Vision Based Bearing Only 3D SLAM", Proceedings of the 2006 IEEE Int'l Conf. on Robotics and Automation, May 15-19, 2006, pp. 1944-1950.

Denis Chekhlov et al., "Real-Time and Robust Monocular SLAM Using Predictive Multi-Resolution Descriptors", 2nd Int'l Symp. on Visual Computing, Nov. 2006, pp. 276-285.

Monica Ballesta et al., "Local Descriptors for Visual SLAM", RoboMat: Workshop on Robotics and Mathematics, Sep. 17-19, 2007, 6 pages.

Stephen SE et al., "Vision-based Mobile Robot Localization and Mapping Using Scale-Invariant Features", Proc. of the 2001 IEEE Int'l Conf. on Robotics and Automation, May 21-26, 2001, pp. 2051-2058.

Jason Meltzer et al., "Simultaneous Localization and Mapping using Multiple View Feature Descriptors", Proc. of 2004 IEEE/RSJ Int'l Conf. on Intelligent Robots and Systems, Sep. 28-Oct. 2, 2004, pp. 1550-1555.

Luo Juan and Oubong Gwun, "A Comparison of SIFT, PCA-SIFT and SURF", Int'l J. of Image Processing (IJIP), Aug. 31, 2009, pp. 143-152, vol. 3 issue 4.

"Invitation to Pay Additional Fees" for International Patent Application No. PCT/US2014/012641, Jan. 23, 2014, 9 pages.

Masayuki Kanbara et al., "A Stereoscopic Video See-Through Augmented Reality System Based on Real-Time Vision-Based Registration", Proceedings IEEE 2000 Virtual Reality, Mar. 18-22, 2000, 8 pages.

"International Search Report and Written Opinion", correlating to PCT/US14/012641, dated Jun. 16, 2014, 18 pages.

Arizona State University, "Lunar Reconnaissance Orbiter Camera", www.lroc.asu.edu/EPO/LROC/lroc.php, printed Dec. 5, 2012, 2 pages.

Premier Farnell PLC, "Laser Componenets—2008364—Laser Diode, 655NM", http://www.newark.com/jsp/search/productdetail.jsp2SKU=24M0531&CMP=KNC-GPLA, printed Oct. 29, 2015, 3 pages.

Wikipedia, "Veritcal-Cavity Surface Emitting Laser", http://en.wikipedia.org/wiki/Vertical-cavity_surface-emitting_laser, printed Dec. 5, 2012, 6 pages.

M. Ghisoni et al., "Single and Multimode VCSEL's Operating with Continuous Relief Kinoform for Focussed Spot-Array Generation", IEEE Photonics Tech. Letters, Nov. 1, 1997, vol. 9, No. 11, 3 pages.

H. Martinsson et al., "Monolithic Integration of Vertical-Cavity Surface-Emitting Laser and Diffractive Optical Element for Advanced Beam Shaping", IEEE Photonics Tech. Letters, May 1, 1999, vol. 11, No. 5, 3 pages.

Johnny Lee, "Electronic Device with Multiview Image Capture and Depth Sensing ", U.S. Appl. No. 13/780,580, 62 pages.

Gabe Sibley, "Beginning of the London Dataset", http://www.youtube.com/watch?v=M-WYOMcizicw, Sep. 22, 2010, 2 pages.

SFLY Project, "SFly: Swarm of Micro Flying Robots (IROS 2012)", http://www.youtube.com/watch?v=_p08o_oT04, May 2, 2012, 3 pages.

Hyon Lim et al., "Real-Time Image-Based 6-DOF Localization in Large-Scale Environments", http://research.microsoft.com/en-us/redmond/groups/IVM/ImageBasedLocalization/paper/limCVPR12.pdf, Jun. 1, 2012, 8 pages.

Movidius LTD., "Movidius MA1133: Bringing HD 3D to Mobile Devices," http://www.movidius.com/assets/Uploads/Movidius-MA1133-Product-Summary2.pdf, Jan. 1, 2012, 2 pages.

\* cited by examiner

3D FEATURE DESCRIPTORS WITH CAMERA POSE INFORMATION

CROSS-REFERENCE TO RELATED APPLICATIONS

The present disclosure is a continuation-in-part (CIP) application of co-pending U.S. patent application Ser. No. 13/780,586, entitled "System for 2D/3D Spatial Feature Processing" and filed on Feb. 28, 2013, the entirety of which is incorporated by reference herein.

FIELD OF THE DISCLOSURE

The present disclosure relates generally to image capture and processing and more particularly to machine vision using captured imagery.

BACKGROUND

Machine vision techniques, such as simultaneous localization and mapping (SLAM), augmented reality (AR), and virtual reality (VR), often rely on the identification of objects within the local environment of a device through the analysis of imagery of the local environment captured by the device. Such objects typically are represented as collections of two-dimensional (2D) feature descriptors, which reflect the orientation and distance of the imaging camera from the object when the corresponding image was taken. When comparing different images related to the object to, for example, verify that the same object is represented in both images, the 2D feature descriptors in each image typically are compared to determine a match. This 2D feature descriptor comparison process is impacted by the fact that the sets of 2D feature descriptors being compared may have been obtained from different observation directions or distances.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

DETAILED DESCRIPTION OF EMBODIMENTS

Figure 1:
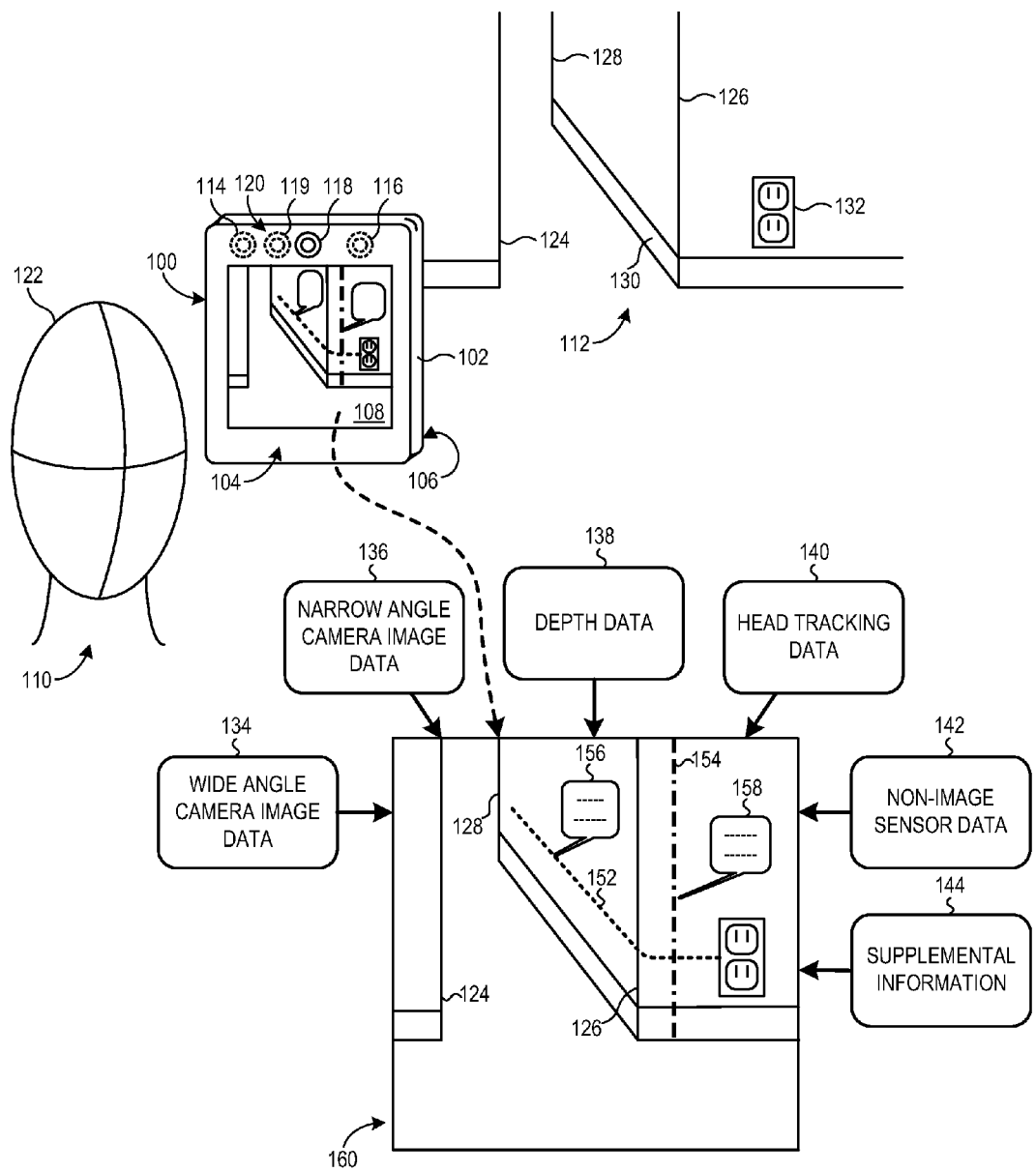
FIG. 1 is a diagram illustrating an electronic device configured to determine a relative position/orientation in a local environment using image sensor data and non-image sensor data in accordance with at least one embodiment of the present disclosure.

The following description is intended to convey a thorough understanding of the present disclosure by providing a number of specific embodiments and details involving the determination of a relative position or relative orientation of an electronic device based on image-based identification of objects in a local environment of the electronic device. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-13 illustrate various techniques for the determination of a relative position or relative orientation of an electronic device within a local environment so as to support location-based functionality, such as augmented reality (AR) functionality, visual odometry or other simultaneous localization and mapping (SLAM) functionality, and the like. The term "position/orientation" is used herein to refer to either or both of position and orientation. In some embodiments, the electronic device includes two or more imaging cameras and a depth sensor disposed at a surface. The two or more imaging cameras may be used to capture multiview imagery of the local environment of the electronic device, and from this information the electronic device may identify spatial features representing objects in the local environment and their distances from the electronic device. Further, the depth sensor may be used to determine the distances of the identified spatial features as either an alternative to, or an augmentation to, the depth calculation provided from analysis of the multiview imagery. The electronic device further may include another imaging camera on a surface facing the user so as to facilitate head tracking or facial recognition or to obtain additional imagery of the local environment.

The identification of the relative position/orientation of objects in the local environment can be used to support various location-based functionality of the electronic device. To illustrate, in some embodiments, the relative positions of objects in the local environment are used, along with non-image sensor data such as orientation readings from a gyroscope, to determine the relative position/orientation of the electronic device in the local environment. The relative position/orientation of the electronic device may be used to facilitate visual odometry, indoor navigation, or other SLAM functionality. Moreover, the relative position/orientation of the electronic device may be used to support augmented reality (AR) functionality, such as the graphical overlay of additional information in the display of imagery captured by the electronic device based on the relative position and orientation of the electronic device, and which also may be based on the position or the orientation of the user's head or eyes relative to the electronic device. In some embodiments, the electronic device determines its position/orientation relative to the local environment, rather than relative to a fixed or defined positioning reference, and thus is not reliant on external positioning information, such as global positioning system (GPS) information, cellular triangulation information, and the like. As such, the electronic device can provide location-based functionality in locations where GPS signaling or cellular signaling is weak or non-existent.

In at least one embodiment, the depth sensor of the electronic device is implemented as a modulated light projector and one or more of the imaging cameras. The modulated light projector projects coded, structured, or otherwise modulated light, typically infrared light, into the local environment, and the one or more imaging cameras capture the reflections of the modulated light from the objects, and from this reflected light the distance of the objects from the electronic device may be determined. As the modulated light projector can consume significant power while projecting, the present disclosure describes various techniques for the selective enablement and control of the depth sensor so as to reduce power consumption.

Further described herein is a processing architecture for analyzing image sensor data and non-image sensor data to efficiently identify 2D and 3D spatial features in imagery of the local environment of the electronic device, and for providing location-based functionality using these identified spatial features. In at least one embodiment, the processing architecture utilizes at least two processors, including one processor for identifying 2D spatial features from image data captured by one or more imaging cameras and another processor for identifying 3D spatial features from the identified 2D spatial features. Further, the processor that identifies the 2D spatial features can be configured to identify 2D spatial features as image data is streamed from the imaging cameras and stream the 2D spatial features to the other processor as they are identified, thereby reducing the delay in spatial feature detection that otherwise would result from waiting for the entire image to be buffered before commencing spatial feature detection.

The present disclosure also describes, with particular reference to FIGS. 10-13, example techniques for generating and using 3D feature descriptors for an imaged object or other point of interest. Each 3D feature descriptor includes a collection of one or more 2D feature descriptors representing the corresponding object or point of interest, whereby each 2D feature descriptor is indexed by, or otherwise associated with, the particular pose of the imaging camera at the time of capture of the image from which the 2D feature was extracted. This pose can include, for example, the direction the imaging camera is facing (i.e., the observation direction), as well as other contextual information, such as a distance of the imaging camera from the subject object, an orientation of the imaging camera relative to a reference orientation, an ambient lighting condition, a time of day, a weather condition, and the like. In some embodiments, the 2D feature descriptors are normalized so as to represent a constant distance from the subject object or constant scale, while in other embodiments the 2D feature descriptors include a representation of the distance of the imaging camera from the subject object when the image was captured so as to permit subsequent scaling for comparison purposes. The 3D feature descriptors generated in this manner may be incorporated into, for example, a 3D map and then used to facilitate object identification or device localization based on comparisons performed between the 2D descriptors of a 3D feature descriptor and 2D descriptors obtained from a subject captured image.

FIG. 1 illustrates an electronic device 100 configured to support location-based functionality, such as SLAM or AR, using image and non-image sensor data in accordance with at least one embodiment of the present disclosure. The electronic device 100 can include a portable user device, such as a tablet computer, computing-enabled cellular phone (e.g., a "smartphone"), a notebook computer, a personal digital assistant (PDA), a gaming system remote, a television remote, and the like. In other embodiments, the electronic device 100 can include a fixture device, such as medical imaging equipment, a security imaging camera system, an industrial robot control system, a drone control system, and the like. For ease of illustration, the electronic device 100 is generally described herein in the example context of a portable user device, such as a tablet computer or a smartphone; however, the electronic device 100 is not limited to these example implementations.

In the depicted example, the electronic device 100 includes a housing 102 having a surface 104 opposite another surface 106. In the example thin rectangular block form-factor depicted, the surfaces 104 and 106 are substantially parallel and the housing 102 further includes four side surfaces (top, bottom, left, and right) between the surface 104 and surface 106. The housing 102 may be implemented in many other form factors, and the surfaces 104 and 106 may have a non-parallel orientation. For the illustrated tablet implementation, the electronic device 100 includes a display 108 disposed at the surface 106 for presenting visual information to a user 110. Accordingly, for ease of reference, the surface 106 is referred to herein as the "forward-facing" surface and the surface 104 is referred to herein as the "user-facing" surface as a reflection of this example orientation of the electronic device 100 relative to the user 110, although the orientation of these surfaces is not limited by these relational designations.

The electronic device 100 includes a plurality of sensors to obtain information regarding a local environment 112 of the electronic device 100. The electronic device 100 obtains visual information (imagery) for the local environment 112 via imaging cameras 114 and 116 and a depth sensor 120 disposed at the forward-facing surface 106 and an imaging camera 118 disposed at the user-facing surface 104. In one embodiment, the imaging camera 114 is implemented as a wide-angle imaging camera having a fish-eye lens or other wide-angle lens to provide a wider angle view of the local environment 112 facing the surface 106. The imaging camera 116 is implemented as a narrow-angle imaging camera having a typical angle of view lens to provide a narrower angle view of the local environment 112 facing the surface 106. Accordingly, the imaging camera 114 and the imaging camera 116 are also referred to herein as the "wide-angle imaging camera 114" and the "narrow-angle imaging camera 116," respectively. As described in greater detail below, the wide-angle imaging camera 114 and the narrow-angle imaging camera 116 can be positioned and oriented on the forward-facing surface 106 such that their fields of view overlap starting at a specified distance from the electronic device 100, thereby enabling depth sensing of objects in the local environment 112 that are positioned in the region of overlapping fields of view via multiview image analysis. The imaging camera 118 can be used to capture image data for the local environment 112 facing the surface 104. Further, in some embodiments, the imaging camera 118 is configured for tracking the movements of the head 122 or for facial recognition, and thus providing head tracking information that may be used to adjust a view perspective of imagery presented via the display 108.

One or more of the imaging cameras 114, 116, and 118 may serve other imaging functions for the electronic device 100 in addition to supporting position and orientation detection. To illustrate, the narrow-angler imaging camera 116 may be configured or optimized for user-initiated image capture, such as for the capture of consumer-level photographs and video as often found in smartphones and tablet computers, and the imaging camera 118 may be configured or optimized for video conferencing or video telephony as also is often found in smartphones and tablet computers, whereas the wide-angle imaging camera 114 may be primarily configured for machine vision image capture for purposes of location detection. This machine-vision-specific configuration may prioritize light-sensitivity, lens distortion, frame rate, global shutter capabilities, and faster data readout from the image sensor over user-centric camera configurations that focus on, for example, pixel resolution.

The depth sensor 120, in one embodiment, uses a modulated light projector 119 to project modulated light patterns from the forward-facing surface 106 into the local environment, and uses one or both of imaging cameras 114 and 116 to capture reflections of the modulated light patterns as they reflect back from objects in the local environment 112. These modulated light patterns can be either spatially-modulated light patterns or temporally-modulated light patterns. The captured reflections of the modulated light patterns are referred to herein as "depth imagery." The depth sensor 120 then may calculate the depths of the objects, that is, the distances of the objects from the electronic device 100, based on the analysis of the depth imagery. The resulting depth data obtained from the depth sensor 120 may be used to calibrate or otherwise augment depth information obtained from multiview analysis (e.g., stereoscopic analysis) of the image data captured by the imaging cameras 114 and 116. Alternatively, the depth data from the depth sensor 120 may be used in place of depth information obtained from multiview analysis. To illustrate, multiview analysis typically is more suited for bright lighting conditions and when the objects are relatively distant, whereas modulated light-based depth sensing is better suited for lower light conditions or when the observed objects are relatively close (e.g., within 4-5 meters). Thus, when the electronic device 100 senses that it is outdoors or otherwise in relatively good lighting conditions, the electronic device 100 may elect to use multiview analysis to determine object depths. Conversely, when the electronic device 100 senses that it is indoors or otherwise in relatively poor lighting conditions, the electronic device 100 may switch to using modulated light-based depth sensing via the depth sensor 120.

The electronic device 100 also may rely on non-image information for position/orientation detection. This non-image information can be obtained by the electronic device 100 via one or more non-image sensors (not shown in FIG. 1), such as a gyroscope or ambient light sensor. The non-image sensors also can include user interface components, such as a keypad (e.g., touchscreen or keyboard), microphone, mouse, and the like. The non-image sensor information representing a state of the electronic device 100 at a given point in time is referred to as the "current context" of the electronic device for that point in time. This current context can include explicit context, such as the relative rotational orientation of the electronic device 100 or the ambient light from the local environment 112 incident on the electronic device 100. The current context also can include implicit context information, such as information inferred from calendar information or clock information, or information inferred from a user's interactions with the electronic device 100. The user's interactions can include a user's observed past behavior (e.g., a determination of a user's workday commute path and time), recent search queries conducted by the user, a key term search or other analysis of emails, text messages, or other user communications or user-initiated operations, and the like.

In operation, the electronic device 100 uses the image sensor data and the non-image sensor data to determine a relative position/orientation of the electronic device 100, that is, a position/orientation relative to the local environment 112. In at least one embodiment, the determination of the relative position/orientation is based on the detection of spatial features in image data captured by one or more of the imaging cameras 114, 116, and 118 and the determination of the position/orientation of the electronic device 100 relative to the detected spatial features. To illustrate, in the depicted example of FIG. 1 the local environment 112 includes a hallway of an office building that includes three corners 124, 126, and 128, a baseboard 130, and an electrical outlet 132. The user 110 has positioned and oriented the electronic device 100 so that the forward-facing imaging cameras 114 and 116 capture wide angle imaging camera image data 134 and narrow angle imaging camera image data 136, respectively, that includes these spatial features of the hallway. In this example, the depth sensor 120 also captures depth data 138 that reflects the relative distances of these spatial features relative to the current position/orientation of the electronic device 100. Further, the user-facing imaging camera 118 captures image data representing head tracking data 140 for the current position/orientation of the head 122 of the user 110. Non-image sensor data 142, such as readings from a gyroscope, a magnetometer, an ambient light sensor, a keypad, a microphone, and the like, also is collected by the electronic device 100 in its current position/orientation.

From this input data, the electronic device 100 can determine its relative position/orientation without explicit absolute localization information from an external source. To illustrate, the electronic device 100 can perform multiview analysis of the wide angle imaging camera image data 134 and the narrow angle imaging camera image data 136 to determine the distances between the electronic device 100 and the corners 124, 126, 128. Alternatively, the depth data 138 obtained from the depth sensor 120 can be used to determine the distances of the spatial features. From these distances the electronic device 100 can triangulate or otherwise infer its relative position in the office represented by the local environment 112. As another example, the electronic device 100 can identify spatial features present in one set of captured images of the image data 134 and 136, determine the initial distances to these spatial features, and then track the changes in position and distances of these spatial features in subsequent captured imagery to determine the change in position/orientation of the electronic device 100. In this approach, certain non-image sensor data, such as gyroscopic data or accelerometer data, can be used to correlate spatial features observed in one image with spatial features observed in a subsequent image.

The relative position/orientation information obtained by the electronic device 100 from the image data captured by the imaging cameras 114, 116, and 118 can be used to support any of a variety of location-based functionality. The relative position/orientation information can be used by the electronic device 100 to support visual odometry or other SLAM functionality. As an example, the electronic device 100 can map the local environment 112 and then use this mapping to facilitate the user's navigation through the local environment 112, such as by displaying to the user a floor plan generated from the mapping information and an indicator of the user's current location relative to the floor plan as determined from the current relative position of the electronic device 100.

Moreover, the relative position/orientation information obtained by the electronic device 100 can be combined with supplemental information 144 to present an augmented reality (AR) view of the local environment 112 to the user 110 via the display 108 of the electronic device 100. This supplemental information 144 can include one or more AR databases locally stored at the electronic device 100 or remotely accessible by the electronic device 100 via a wired or wireless network.

To illustrate, in the depicted example of FIG. 1, a local database stores position/orientation computer-aided drawing (CAD) information for electrical wiring embedded within the walls of the office represented by the local environment 112. Accordingly, the electronic device 100 can capture video imagery of a view of the local environment 112 via the imaging camera 116, determine a relative orientation/position of the electronic device 100 as described above and herein, and determine the position and orientation of electrical wiring located within the walls present in the view of the local environment. The electronic device 100 then can generate a graphical overlay with visual representations of the electrical wiring positioned and oriented relative to corresponding spatial features (e.g., the corners 124, 126, and 128) identified in the video imagery. As illustrated in FIG. 1, the graphical overlay can include colored dashed lines 152 and 154 representing electrical wiring in the current view and description balloons 156 and 158 to provide descriptions of the electrical wiring, such as wiring type, an identifier associated with the wiring, and the building components powered by the corresponding wiring. The electronic device 100 then jointly presents the graphical overlay and the video imagery at the display 108 so as to present the user 110 with a graphical representation 160 of the location of electrical wiring within the current view of the local environment 112 as captured by the narrow angle imaging camera 116. As the electronic device 100 moves relative to the previous view, the electronic device 100 updates the graphical overlay so as to reflect the changed perspective. Moreover, the head tracking data 140 can be used to detect changes in the position of the head 122 of the user 110 relative to the display 108, in response to which the electronic device 100 can adjust the displayed graphical representation 160 so as to reflect the changed viewing angle of the user 110 relative to the display 108.

As another example, a local or remote AR database can be used to facilitate indoor navigation via the electronic device 100. To illustrate, the local environment 112 could represent the interior of a shopping mall and, in response to receiving user input indicating a desire to locate a certain store, the electronic device 100 can access the AR database to determine the location of the store relative to its current location. With this information, the electronic device 100 can display on top of the video imagery currently captured by one or more of the imaging cameras 114, 116, or 118 a graphical overlay that identifies the direction of the store relative to the current direction in which the electronic device 100 is pointed (e.g., via the display of "turn right", "turn left", "proceed straight ahead", or "turn around" arrow graphics).

Another example application of the relative position/orientation determination process can include, for example, missing/new object detection whereby the appearance of a new object or the disappearance of a previously identified object can be determined based on a comparison of the expected local environment view of the electronic device 100 for a given relative position and orientation to the actual local environment view captured by the electronic device 100 in the same position/orientation. As described below, the geometric uncertainty introduced by differences between an expected environment and the actual encountered environment can trigger various operations, including a refresh operation whereby the electronic device 100 initiates a remapping of the portion of the local environment 112 exhibiting the change.

Figure 3:
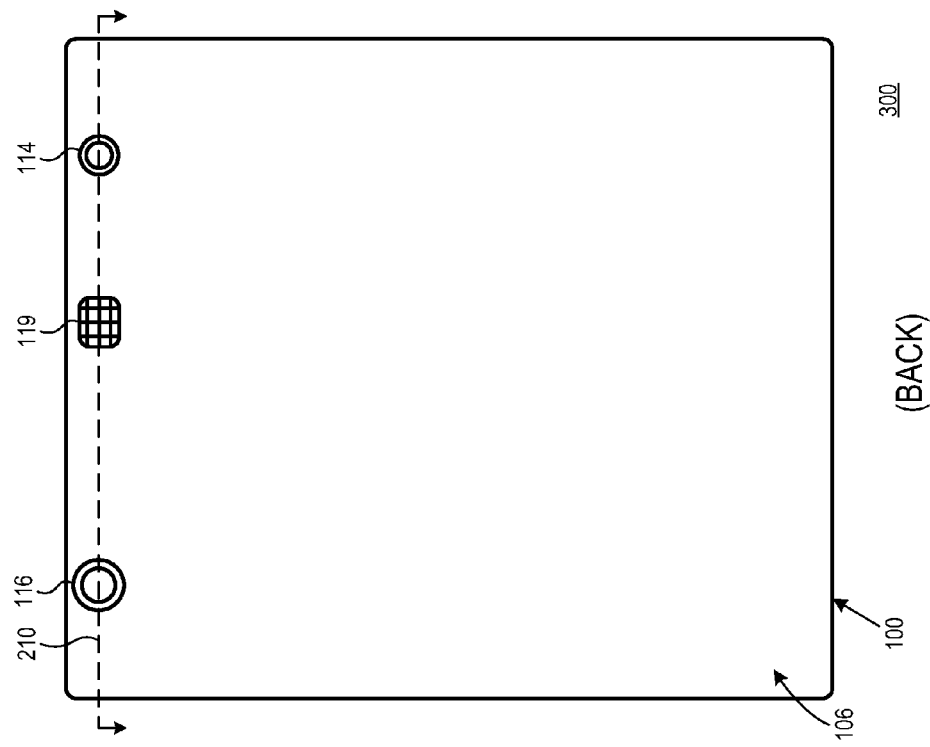
FIG. 3 is a diagram illustrating a back plan view of the electronic device of FIG. 2 in accordance with at least one embodiment of the present disclosure.
Figure 2:
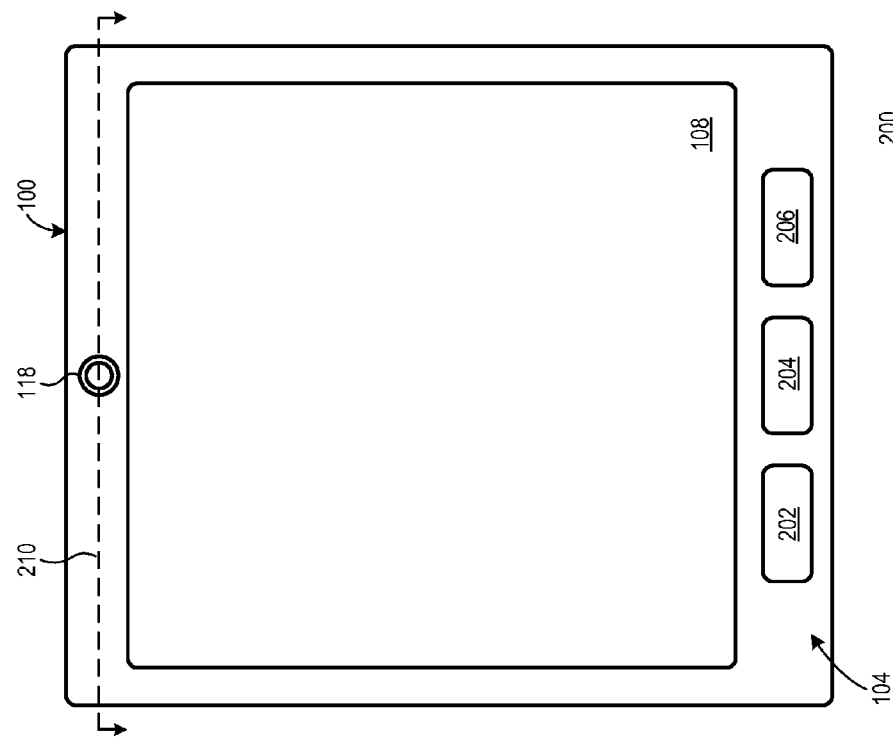
FIG. 2 is a diagram illustrating a front plan view of an electronic device implementing multiple imaging cameras and a depth sensor in accordance with at least one embodiment of the present disclosure.

FIGS. 2 and 3 illustrate example front and back plan views of an example implementation of the electronic device 100 in a tablet form factor in accordance with at least one embodiment of the present disclosure. The electronic device 100 may be implemented in other form factors, such as a smart phone form factor, a medical imaging device form factor, and the like, which implement configurations analogous to those illustrated.

As illustrated by the front plan view 200 of FIG. 2, the electronic device 100 can include the display 108, the imaging camera 118, and one or more user interface components, such as touch keys 202, 204, and 206 of a keypad disposed at the user-facing surface 104. Moreover, the display 108 may be implemented as a touch screen display so as to facilitate user input and control via the user's interaction with the display 108.

As illustrated by the back plan view 300 of FIG. 3, the electronic device 100 can include the wide-view imaging camera 114, the narrow-view imaging camera 116, and the modulated light projector 119 disposed at the forward-facing surface 106. Although FIGS. 2 and 3 illustrate the imaging cameras 114, 116, and 118 and the modulated light projector 119 aligned along a straight line for the benefit of an example cross-section view in FIG. 4, the imaging cameras 114, 116, and 118 and the modulated light projector 119 may be offset relative to each other. For example, the modulated light projector 119 may be positioned at an offset from a line extending between the imaging cameras 114 and 116, or the modulated light projector 119 and the wide-angle imaging camera 114 may be disposed along a line parallel to the top edge of the electronic device 100 and the narrow-angle imaging camera 116 may be disposed at a location offset from this line. Moreover, although the modulated light projector 119 is illustrated as positioned between the imaging cameras 114 and 116, in other implementations the modulated light projector 119 may be positioned to the outside of one of the imaging cameras 114 and 116.

Figure 4:
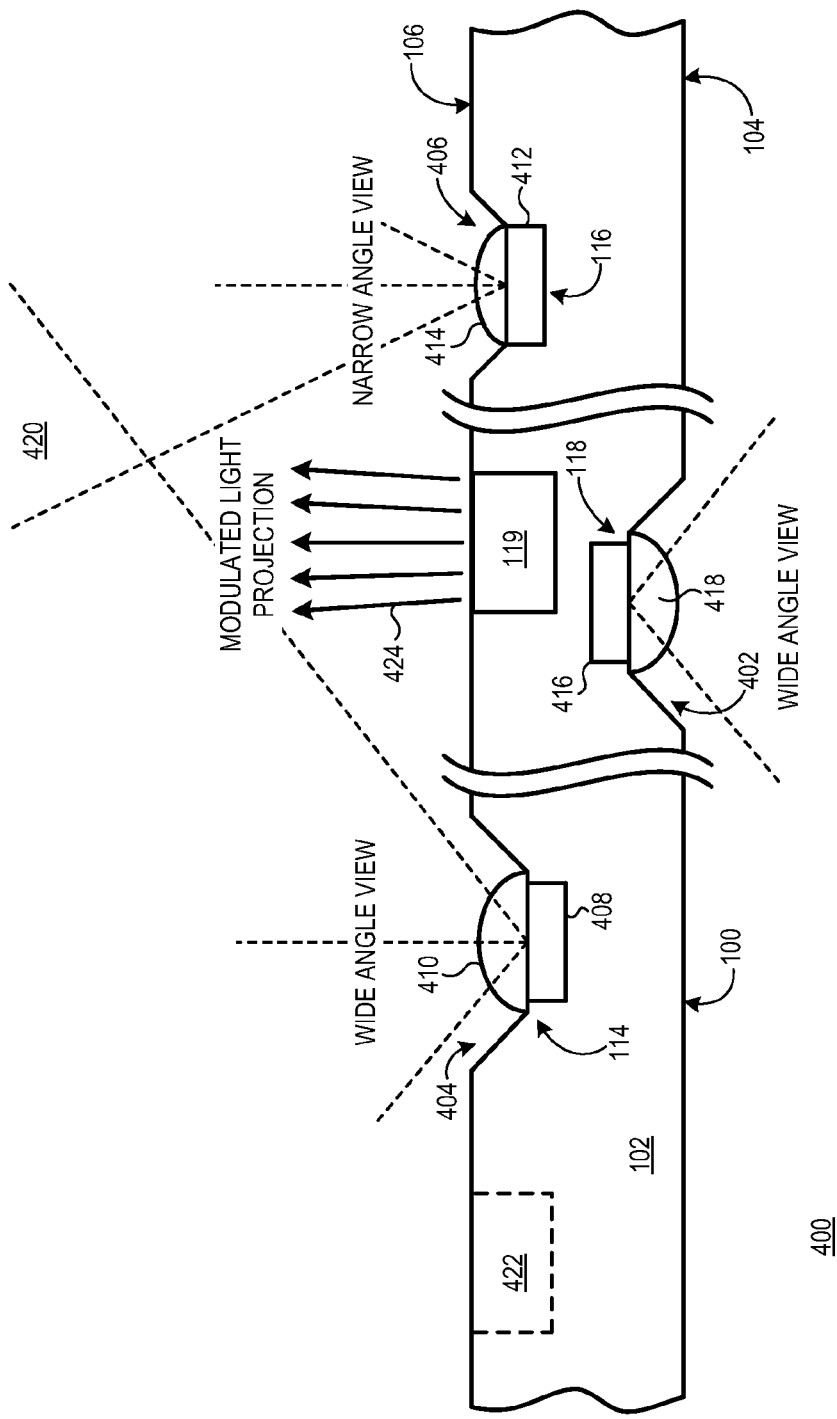
FIG. 4 is a diagram illustrating a cross-section view of the electronic device of FIG. 2 in accordance with at least one embodiment of the present disclosure.

FIG. 4 illustrates an example cross-section view 400 of the electronic device 100 along a line 210 depicted in the plan views of FIGS. 2 and 3 in accordance with at least one embodiment of the present disclosure. As illustrated, the electronic device 100 includes the user-facing imaging camera 118 disposed in an aperture 402 or other opening in the housing 102 at the user-facing surface 104 and includes the wide-angle imaging camera 114 and the narrow-angle imaging camera 116 disposed in apertures 404 and 406, respectively, or other openings in the housing 102 at the forward-facing surface 106. The wide-angle imaging camera 114 includes an image sensor 408 and one or more lenses 410 disposed over a sensing surface of the image sensor 408. The narrow-angle imaging camera 116 includes an image sensor 412 and one or more lenses 414 disposed over the sensing surface of the image sensor 412. Similarly, the user-facing imaging camera 118 includes an image sensor 416 and one or more lenses 418 disposed over the sensing surface of the image sensor 416.

The type of lens implemented for each imaging camera depends on the intended function of the imaging camera. As the forward-facing imaging camera 114, in one embodiment, is intended for machine vision-specific imagery for analyzing the local environment 112, the lens 410 may be implemented as a wide-angle lens or a fish-eye lens having, for example, an angle of view between 160-180 degrees with a known high distortion. The forward-facing imaging camera 116, in one embodiment, supports user-initiated image capture, and thus the lens 414 of the forward-facing imaging camera 116 may be implemented as a narrow-angle lens having, for example, an angle of view between 80-90 degrees horizontally. Note that these angles of view are exemplary only. The user-facing imaging camera 118 likewise may have other uses in addition to supporting local environment imaging or head tracking. For example, the user-facing imaging camera 118 also may be used to support video conferencing functionality for the electronic device 100. Accordingly, depending on the application the lens 418 of the user-facing imaging camera 118 can be implemented as a narrow-angle lens, a wide-angle lens, or a fish-eye lens.

The image sensors 408, 412, and 416 of the imaging cameras 114, 116, and 118, respectively, can be implemented as charge coupled device (CCD)-based sensors, complementary metal-oxide-semiconductor (CMOS) active pixel sensors, and the like. In a CMOS-based implementation, the image sensor may include a rolling shutter sensor whereby a group of one or more rows of pixel sensors of the image sensor is read out while all other rows on the sensor continue to be exposed. This approach has the benefit of providing increased sensitivity due to the longer exposure times or more usable light sensitive area, but with the drawback of being subject to distortion due to high-speed objects being captured in the frame. The effect of distortion can be minimized by implementing a global reset mechanism in the rolling shutter so that all of the pixels on the sensor begin collecting charge simultaneously, rather than on a row-by-row basis. In a CCD-based implementation, the image sensor can be implemented as a global shutter sensor whereby all pixels of the sensor are exposed at the same time and then transferred to a shielded area that can then be read out while the next image is being exposed. This approach has the benefit of being less susceptible to distortion, with the downside of generally decreased sensitivity due to the additional electronics required per pixel.

In some embodiments the fields of view of the wide-angle imaging camera 114 and the narrow-angle imaging camera 116 overlap in a region 420 so that objects in the local environment 112 (FIG. 1) in the region 420 are represented both in the image captured by the wide-angle imaging camera 114 and in the image concurrently captured by the narrow-angle imaging camera 116, thereby allowing the depth of the objects in the region 420 to be determined by the electronic device 100 through a multiview analysis of the two concurrent images. As such, the forward-facing imaging cameras 114 and 116 are positioned at the forward-facing surface 106 so that the region 420 covers an intended distance range and sweep relative to the electronic device 100. Moreover, as the multiview analysis relies on the parallax phenomena, the forward-facing imaging cameras 114 and 116 are sufficiently separated to provide adequate parallax for the multiview analysis.

Also illustrated in the cross-section view 400 are various example positions of the modulated light projector 119. The modulated light projector 119 projects an infrared modulated light pattern 424 in a direction generally perpendicular to the surface 106, and one or both of the forward-facing imaging cameras 114 and 116 are utilized to capture the reflection of the projected light pattern 424. In the depicted example, the modulated light projector 119 is disposed at the forward-facing surface 106 at a location between the imaging cameras 114 and 116. In other embodiments, the modulated light projector 119 can be disposed at a location between one of the imaging cameras and an edge of the housing 102, such as at a location 422 between the wide-angle imaging camera 114 and the side of the housing 102, or at a location (not shown) between the narrow-angle imaging camera 116 and the side of the housing 102.

Figure 6:
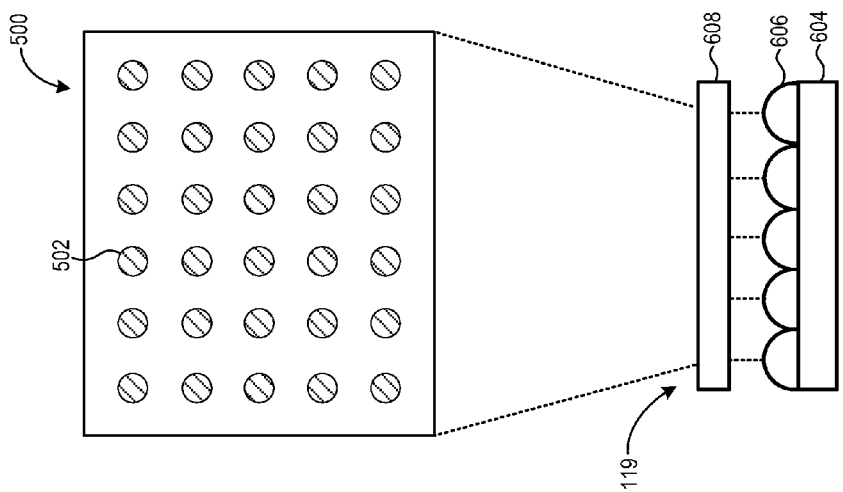
FIG. 6 is a diagram illustrating a cross-section view of a vertical-cavity surface-emitting laser (VCSEL) diode-based modulated light projector in accordance with at least one embodiment of the present disclosure.
Figure 5:
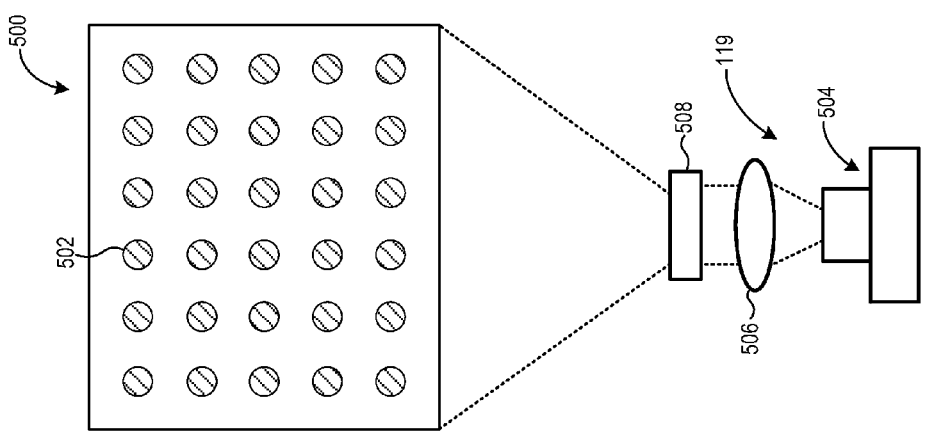
FIG. 5 is a diagram illustrating a cross-section view of a collimating lens-based modulated light projector in accordance with at least one embodiment of the present disclosure.

FIGS. 5 and 6 illustrate example implementations of the modulated light projector 119 in accordance with various embodiments of the present disclosure. In both instances, the modulated light projector 119 operates to project a modulated light pattern 500 composed of infrared light or, in some instances, visible light having a specified color or set of colors, or a specified frequency. In some embodiments, the modulated light pattern 500 comprises a spatially-modulated light pattern, such as the projection of a DeBruijn sequence, an M-array of light features (such as the illustrated matrix of dots 502, whereby the dots 502 are areas of high light intensity), and the like. Other spatially-modulated light patterns that may be implemented include, for example, concentric ring patterns or concentric rectangular patterns, parallel lines, or parallel and perpendicular lines (i.e., a grid), and the like. In other embodiments, the modulated light pattern 500 comprises a temporally-modulated (time-multiplexed) light pattern sequence, such as a binary code pattern sequence, an n-ary code pattern sequence, and the like. In temporally-modulated light applications, the depth sensor 120 determines the depth data through an analysis of a corresponding sequence of reflected light patterns, rather than through any reflected pattern individually.

The projection of the modulated light pattern 500 into the local environment of the electronic device 100 results in the reflection of light from objects in the local environment. Because the depth, or distance, of a surface of an object from the modulated light projector 119 impacts the reflection of the projected light incident on the surface, the electronic device 100 can use the pattern distortion present in the reflection of the modulated light pattern 500 to determine the depth of the object surface using any of a variety of well-known modulated light depth estimation techniques. Alternatively, both of the forward-facing imaging cameras 114 and 116 can be used to capture the reflection of the projected modulated light pattern 500 and multiview image analysis can be performed on the parallel captured depth imagery to determine the depths of objects in the local environment. In other embodiments, the electronic device 100 can use one or both of the forward-facing imaging cameras 114 and 116 as time-of-flight imaging cameras synchronized to the projection of the modulated light pattern 500, whereby the electronic device 100 calculates the depths of objects in the captured reflections using any of a variety of well-known time-of-flight depth algorithms. As yet another example, the electronic device 100 can employ a high-speed exposure shutter imaging camera (either as one of the forward-facing imaging cameras 114 and 116 or as a separate forward-facing imaging camera) that captures reflected light from a pulse of infrared light or near-infrared light from the modulated light projector 119, whereby the amount of reflected pulse signal collected for each pixel of the sensor corresponds to where within the depth range the pulse was reflected from, and can thus be used to calculate the distance to a corresponding point on the subject object. The ZCam™ imaging camera available from 3DV Systems, Inc. is an example of a commercial implementation of this type of imaging-based depth sensor.

In the example of FIG. 5, the modulated light projector 119 is implemented as an edge-emitting laser diode 504 that emits divergent IR laser light toward a collimating lens 506, which collimates the divergent laser light and directs the collimated laser light to a diffractive optical element (DOE) 508 (also frequently referred to as a "kinoform"), which generates the modulated light pattern 500 from the collimated laser light. The DOE 508, in one embodiment, can function in effect as a beam splitter to generate a pattern, such as an array of dots 502 illustrated in FIG. 5.

In the example of FIG. 6, the modulated light projector 119 is implemented using an array of one or more vertical-cavity surface-emitting laser (VCSEL) diodes 604 that emits divergent laser light. An array 606 of micro-lenses is disposed at the emitting surface of the one or more VCSEL diodes 604 for collimating and focusing the laser light from the VCSEL diode 604. A DOE 608 is disposed over the array 606 of micro-lenses to project the resulting collimated laser light as the modulated light pattern 500. The example implementation of FIG. 6 has the benefit of generally being thinner and having lower power consumption compared to edge-emitting laser diode implementations of comparable output. In some embodiments, the modulated light projector 119 further may include a focusing lens (not shown) disposed over the DOE 608.

Figure 7:
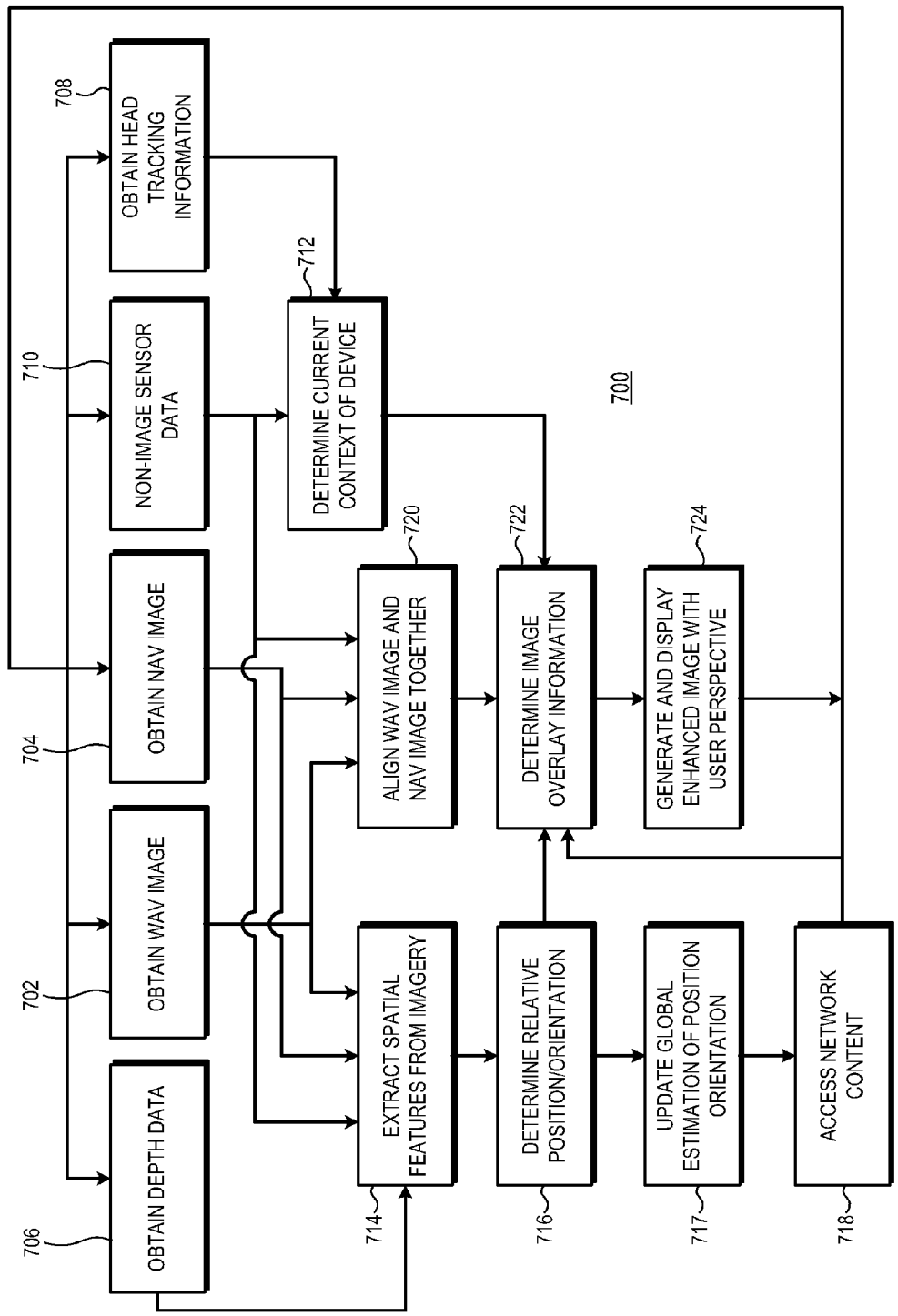
FIG. 7 is a flow diagram illustrating an operation of an electronic device to determine a relative position/orientation of the electronic device in a local environment based on image sensor data and non-image sensor data in accordance with at least one embodiment of the present disclosure.

FIG. 7 illustrates an example method 700 of operation of the electronic device 100 for providing location-based functionality in accordance with at least one embodiment of the present disclosure. For ease of illustration, the method 700 is depicted and generally described as a single loop of operations that can cycle repeatedly. However, not all operations must cycle at the same rate, as described in detail below. It is understood that the steps of the depicted flowchart of FIG. 7 can be performed in any order, and certain ones can be eliminated, and/or certain other ones can be added or repeated depending upon the implementation.

An iteration of method 700 initiates with the capture of various image sensor data and non-image sensor data. In one embodiment, the capture of the sensor data is triggered by, or otherwise synchronized to, the capture of concurrent images by one or more of the imaging cameras 114, 116, and 118 (FIG. 1) of the electronic device 100. In other embodiments, various sensor data may be periodically or otherwise repeatedly obtained and then synchronized to captured image data using timestamps or other synchronization metadata. This capture of sensor data can include the capture of wide angle view (WAV) image data for the local environment 112 (FIG. 1) via the wide-angle imaging camera 114 (FIG. 1) at block 702 and the capture of narrow angle view (NAV) image data for the local environment 112 via the narrow-angle imaging camera 116 at block 704. Further, in the event that the depth sensor 120 is activated, depth data for the local environment can be captured via the depth sensor 120 at block 706. Furthermore, head tracking data representing the current position of the user's head 122 can be obtained from the user-facing imaging camera 118 at block 708.

At block 710, the electronic device 100 captures sensor data from one or more non-image sensors. To this end, the electronic device 100 can implement any of a variety of non-image sensors to facilitate the determination of the relative position/orientation of the electronic device 100. Such non-image sensors can include one or more of a gyroscope, an accelerometer, a magnetometer, an altimeter, and a gravity gradiometer that provide explicit information pertaining to the relative position, orientation, or velocity of the electronic device 100. The non-image sensors also can include sensors to provide context for the local environment 112, such as ambient light sensors to sense the degree of ambient light incident on the electronic device and temperature gauges to sense the current temperature of the local environment. Further, the non-image sensor data obtained by the electronic device 100 can include implicit context information, such as keywords, search terms, or location indicia discerned from a user's manipulation of a keyboard or touchscreen of the electronic device 100 or discerned from the user's speech as captured by a microphone of the electronic device 100. The user's usage history likewise can serve as implicit context information.

It should be noted that different sensors may be read at different rates or frequencies. For example, an ambient light reading may be taken only once for every N image captures by the imaging cameras 114, 116, and 118, whereas a six-degrees-of-freedom (6DoF) reading from the gyroscope may be taken every image capture so as to enable detection of the relative orientation of the electronic device 100 when the corresponding image was captured. Still further, accelerometer readings may be obtained at a rate much higher than the image capture rate so as to facilitate a more accurate internal navigation determination by the electronic device 100.

At block 712, the electronic device 100 uses the captured non-image sensor data to determine a current context of the electronic device 100. The current context collectively represents non-position state information for the electronic device 100 that may facilitate the determination of the relative position of the electronic device 100 or that may facilitate the presentation of augmented information based on the determined relative position of the electronic device. This state information can include explicit state information, such as state information gleaned from various non-image sensors. Examples of explicit state information that may be represented in current context can include: the current 6DoF orientation of the electronic device 100; the current relative velocity of the electronic device 100; the current ambient light incident on the electronic device 100; the current time, day of week, or calendar date; the availability or signal strength of various wireless signaling (e.g., signaling from a cellular base station or wireless local area network access point); and the like. The state information represented in the current context also can include implicit state information; that is, information implied from other information available to the electronic device 100. Examples of implicit state information can include: a keyword search or key term analysis of recent text input by the user via a keyboard or touchscreen; recent web searches performed by the user via the electronic device 100; a history of the user's location-related habits (e.g., an history of the user's commutes to and from work); hints at the user's intended destination from an analysis of e-mail or other records stored at the electronic device 100 or at a remote location; and the like.

At block 714 the electronic device 100 analyzes the captured image sensor data and depth data to identify spatial features of the local environment 112 that are represented in the captured imagery. Spatial features that may be so identified can include simple structures in the captured imagery, such as edges and corners or other interest points, or may include more complex structures, such as curves, planes, blobs, or entire objects. The electronic device 100 can utilize any of a variety of well-known digital image processing techniques to extract spatial features from the captured images, such as the Canny edge detector or the Sobel operator to detect edges, the FAST corner detector or the Harris and Stephens corner detector to detect corners, or the Laplacian of Gaussian (LoG) or the Difference of Gaussian (DoG) detectors to detect corners or blob objects.

The electronic device 100 can perform the spatial feature detection process for one or more of the wide angle view (WAV) image captured by the wide-angle imaging camera 114, the narrow angle view (NAV) image captured by the narrow-angle imaging camera, the image captured by the user-facing imaging camera 118, as well as the reflected modulated light image captured by the depth sensor 120 (which may include an image captured by one of the forward-facing imaging cameras 114 and 116).

The identification of the spatial features in an image provides the relative location of those spatial features in a two-dimensional space, that is, "2D spatial features." In order to map a 2D spatial feature to a third dimension (i.e., the distance, or "depth" from the electronic device 100), that is, to determine the corresponding "3D image feature", the electronic device 100 determines the depth of the 2D feature relative to the electronic device 100 using one or both of multiview image analysis or analysis using the depth sensor data.

For multiview image analysis, the electronic device 100 relies on the parallax phenomenon by matching spatial features identified in the WAV image to spatial features identified in the corresponding NAV image using any of a variety of feature matching techniques, and then calculating the relative depth of each spatial feature based on the shift in position of the spatial feature between the two images and based on the distance between the optical axis of the wide-angle imaging camera 114 and the optical axis of the narrow-angle imaging camera 116. For identifying the depth of a 2D feature using the depth sensor data, the electronic device 100 matches spatial features identified in at least one of the visible-light images (that is, one of the NAV image or the WAV image) to spatial features identified in the depth sensor data, and the electronic device 100 can determine an identified visible-light spatial feature as having the depth-distance indicated by a matching spatial feature from the depth sensor data. Rather than, or in addition to, using the WAV image or NAV image, in some embodiments the electronic device 100 can use an aligned (or "stitched") image generated from the alignment and combination (or "stitching") of the WAV image and the NAV image, as described below with reference to block 720.

With the 3D spatial features identified in the current captured imagery of the local environment 112, at block 716 the electronic device 100 determines or updates its current relative position/orientation based on an analysis of the 3D spatial features. In one embodiment, the electronic device 100 implements a visual odometry-based position/orientation detection process whereby the electronic device 100 determines its new position/orientation relative to its previously determined position/orientation based on the shifts in positions of the same spatial features between current captured imagery and previously-captured imagery in a process commonly referred to as "optical flow estimation," Example algorithms for optical flow estimation includes the well-known Lucas-Kanade method, as well as template-based approaches or feature descriptor matching-based approaches.

In some embodiments, the electronic device 100 utilizes the current context determined at block 712 to aid the determination of the current position/orientation. In some implementations, the current context is used to verify or refine a position/orientation reading originally determined through imagery analysis. To illustrate, the electronic device 100 may determine an orientation reading from the imagery analysis and then use the most recent 6DoF reading from a gyroscope sensor to verify the accuracy of the image-based orientation reading. As another example, the electronic device 100 may determine a current position from imagery analysis, determine the average velocity the electronic device 100 would have needed to travel at to transition from the previously determined position to the current position, and then verify that this estimated velocity with one or more readings from an accelerometer so as to verify that the estimated current position is consistent with the measured velocity readings. In some embodiments, the electronic device 100 utilizes the current context determined at block 712 to filter the image data to be utilized in performing the imagery analysis for position/orientation detection. As one example, the electronic device 100 may use a 6DoF reading from a gyroscope or a gravitational orientation reading from a gravity gradiometer to determine the current gravitational orientation of the electronic device 100 and use this information to avoid spatial feature correlation efforts for potential spatial feature matches that would not be possible given the gravitational orientation of the electronic device 100.

Further, the electronic device 100 may use user-provided location context to more precisely identify the general location or area of the electronic device 100. As an example, the electronic device 100 may detect a reference to a particular shopping mall in the user's recent email, audio, or text messaging communications, and thus infer that the user is located at the shopping mall. From this, the electronic device 100 can, for example, access a database having location/mapping information for the shopping mall and focus the imagery-based localization based on this location/mapping information.

Mobile robots often implement simultaneous localization and mapping (SLAM) algorithms to both map a local environment and determine their relative location within the mapped environment without a priori knowledge of the local environment. The electronic device 100 can utilize these same SLAM techniques using multiple iterations of the position/orientation determination process of block 716 over time so as to generate a map of the local environment 112 while concurrently determining and updating the position/ orientation of the electronic device 100 at each appropriate point in time. This local mapping information can be utilized by the electronic device 100 to support any of a variety of location-based functionality, such as use in determining a path for a user to a specified destination and providing visual navigational aids to the user according to this path, as described in greater detail below.

In some embodiments, the electronic device 100 may maintain estimates of the global, or absolute, position/orientation of spatial features identified in the local environment 112. To this end, the electronic device 100 may, at block 717, update global location estimations of spatial features identified at block 714 using non-image sensor data representative of global position/orientation information, such as sensor data captured at block 710 from a GPS receiver, a magnetometer, gyrocompass or other digital compass, and the like. This global position/orientation information may be used to determine the global position/orientation of the electronic device 100, and from this information, the electronic device 100 can estimate the global position/orientations of identified spatial features based on their positions/orientations relative to the electronic device 100. The electronic device 100 then may store or update this estimated global position/orientation for a spatial feature as metadata associated with the spatial feature.

Moreover, the electronic device 100 can use these estimates of the global positions/orientations of spatial features to selectively forgo the process of obtaining updates to certain non-image sensor data at an iteration of block 710. For example, if the electronic device 100 identifies a repeating spatial feature (that is a spatial feature also identified from a previous iteration of block 714), the electronic device 100 can use the estimate of the global position/orientation of this repeated spatial feature in place of certain other non-image sensor data, such as GPS data from a GPS receiver. In a similar approach, the electronic device 100 also can use the estimated global positions/orientations previously determined for one or more spatial features to assign estimated global positions/orientations to newly-encountered spatial features based on their estimated positions/orientations relative to the previously-mapped spatial features.

With the determination of the current position/orientation of the electronic device 100 and various spatial features identified from the image data captured at the current position/orientation, at block 718 the electronic device 100 can access network content based on the current position/orientation so as to support certain location-based functionality of the electronic device 100 or to support certain location-based functionality of a networked system in communication with the electronic device 100. As an example, the electronic device 100 may support a networked multi-player video game that provides a virtual reality based on the local area of the electronic device 100. With the current position/orientation, the electronic device 100 can access player state information so as to display the positions of other players relative to the current position of the electronic device 100. As another example, the electronic device 100 may support a friend-mapping application that maps the locations of friends, colleagues and other persons of interest to the user. The electronic device 100 can provide its current position to a centralized server, which both updates other users' accounts to reflect the current position and updates the electronic device 100 with other users that are within a specified distance of the current location.

In addition to, or instead of, downloading network content, the electronic device 100 may upload device content to a network at block 718. The uploaded device content may include, for example, image data, information pertaining to identified spatial features and their corresponding metadata, relative position/orientation information, estimated absolute position/orientation information, and the like. This uploaded device content may be assimilated into a database of such information from a multitude of similar devices, and this database then may be used to provide various location-based services. For example, content data from the electronic device 100 may be integrated with similar content to provide imagery, location, and routing information for network-connected navigation/mapping software applications.

As noted above, the electronic device 100 can include a display 108 (FIG. 1) to display imagery of the local environment 112 captured using one or both of the forward-facing imaging cameras 114 and 116. The displayed imagery also can include augmented reality graphical information, such as the example described above with reference to FIG. 1 whereby the positions of electrical wiring in the walls of an office are noted in a graphical overlay synchronized to the displayed imagery of the walls. To this end, at block 720 the electronic device 100 performs an image alignment process to combine one or more WAV images and one or more NAV images captured at one or more iterations of blocks 702 and 704 to form a single combined image. The image alignment process can add detail from a NAV image to a WAV image to provide a more detailed version of the WAV image, or vice versa. Alternatively, multiple NAV images can be aligned and combined to form a single image that depicts a larger area (e.g., a panorama) than the individual NAV images. In other embodiments, the electronic device 100 can instead elect to present either the WAV image or the NAV image without modification.

At block 722, the electronic device 100 determines the AR information to be graphically presented to the user as a graphical overlay for the image generated or selected at block 720 and provides the image and the graphical overlay for display at the electronic device 100 at block 724. The AR information can be locally stored at the electronic device 100, such as in a hard drive or a removable media storage device. As discussed above with reference to block 718, the AR information may be remotely stored, such as at an Internet-connected server accessed by the electronic device 100 via a WLAN or cellular data connection, and AR information may be accessed in response to the determination of the current position/orientation. The particular AR information presented to the user in conjunction with the image can be selected based on explicit user information, such as by the user selecting the virtual display of the positions of heating, ventilation, and air conditioning (HVAC) ducts within the walls, floors, and ceilings of the local environment 112. The AR information selected for presentation also can be selected based on implicit selection criteria. For example, in response to detecting that the user is traveling toward a specified destination identified in the user's text message communications, the electronic device 100 can generate AR information that presents various metrics pertaining to the user's progress toward the destination, such as the estimated time needed to reach the destination from the user's current position, the compass direction of the destination relative to the user's current position, and the like.

The view perspective of the AR information presented in the graphical overlay often may be dependent on the particular position/orientation of the electronic device 100 as determined at block 716. For example, a user may interface with a GUI of the electronic device 100 to direct the electronic device 100 to aid the user in finding an exit door. Assuming the electronic device 100 has mapped the local environment 112 though a SLAM process at block 716 and has identified the exit door through this mapping, the electronic device 100 can use the current position of the electronic device 100 relative to this mapping to determine a route through the local environment to the exit door and then use the orientation of the electronic device 100 to direct navigational arrow graphics that navigate the user to the exit door. As the user (and the electronic device 100) moves along the path to the exit door, the electronic device 100 can update the navigational arrow graphic presented to reflect any changes in direction necessary to continue navigating the path to the exit door. In a more sophisticated application, electrical wiring and HVAC duct location information for the office may be stored in a computer-aided drawing (CAD) form such that the electronic device 100 can present the graphical representations of the electrical wiring and HVAC duct locations present in the presented image of the area of the office facing the rear of the electronic device 100 in a three-dimensional form that correlates to the relative positions/orientations of the corresponding walls, floors, and ceilings present in the presented image. As the user moves the electronic device 100 around the office, the presented image of the local environment 112 changes and thus the electronic device 100 updates the electrical wiring and HVAC duct overlay to reflect the changes in the area of the office presented as imagery at the display 108.

The view perspective presented by the graphical overlay also may be modified based on changes in the position of the user's head (or the user's eyes) relative to the display 108. To this end, the electronic device 100 can react to head/eye position changes as represented in the head tracking or eye tracking information captured at block 708 to change the view perspective of the image and graphical overlay presented at the display 108.

As noted above, the electronic device 100 cycles through iterations of the method 700 to provide real-time, updated localization, mapping, and augmented reality display. However, these sub-processes do not necessarily cycle at the same rate. To illustrate, the image alignment and AR processes may update/cycle at the same frame rate as the imaging cameras 114, 116, and 118 because these processes are directly tied to the captured imagery. However, the non-image sensor capture and current context determination may proceed at different cycle rates. To illustrate, it may be appropriate to capture gyroscopic or inertial sensor states more frequently than the frame rate in order to have sufficiently accurate inertial navigation estimation. Conversely, the location-related features of the electronic device 100 may not require a high position resolution, and thus the image analysis process to determine the current position/orientation of the electronic device 100 may occur at a cycle rate slower than the frame rate of the imaging cameras.

Figure 8:
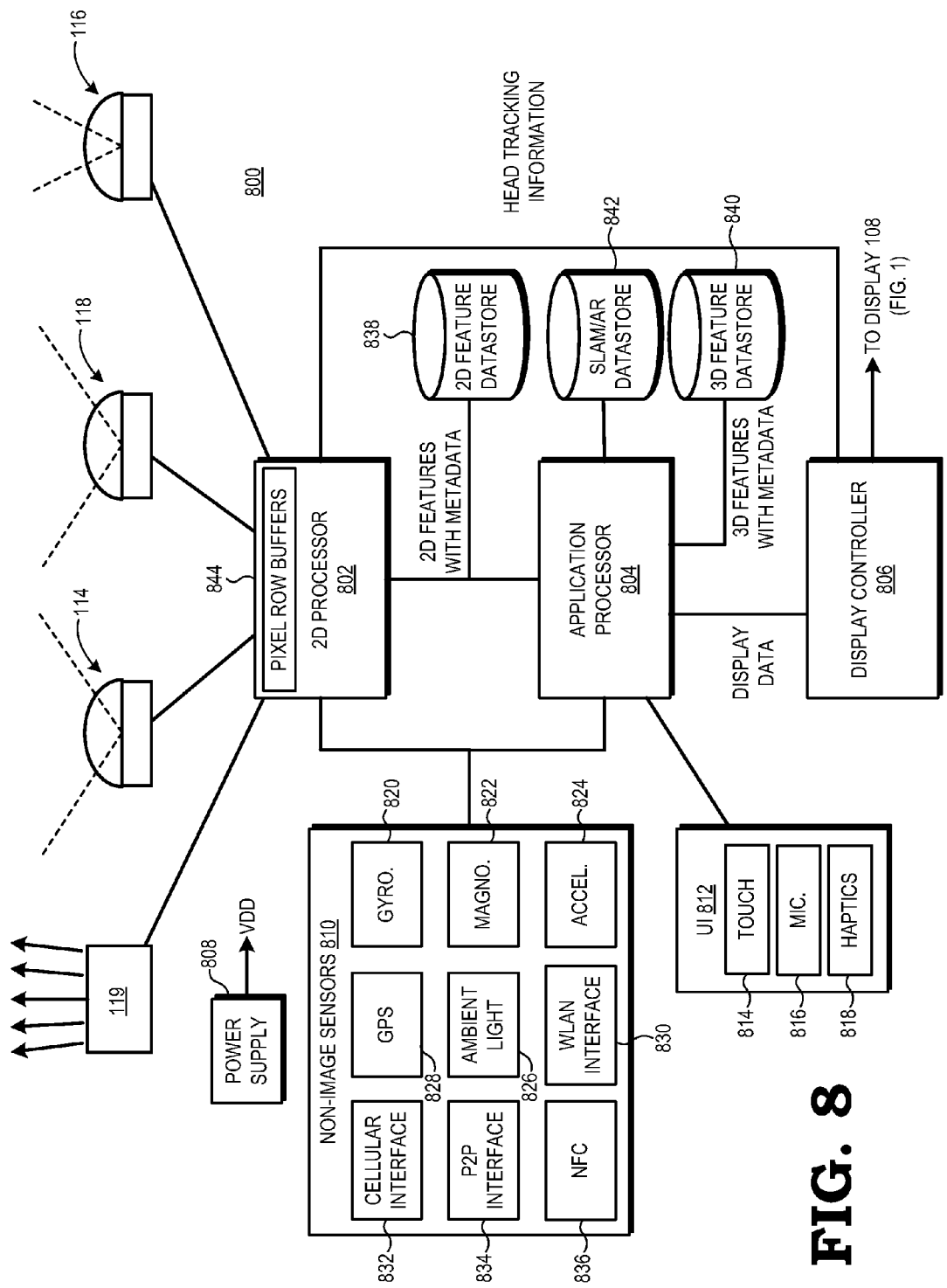
FIG. 8 is a block diagram illustrating a processing system of an electronic device for determining two-dimensional (2D) and three-dimensional (3D) spatial feature data from captured imagery of a local environment in accordance with at least one embodiment of the present disclosure.

FIG. 8 illustrates an example processing system 800 implemented by the electronic device 100 in accordance with at least one embodiment of the present disclosure. The processing system 800 includes the wide-angle imaging camera 114, the narrow-angle imaging camera 116, the user-facing imaging camera 118, and the depth sensor 120. The processing system 800 further includes a 2D processor 802, an application processor 804, a display controller 806, a power supply 808, a set 810 of non-image sensors, and a user interface 812.

In a portable user device implementation, such as a tablet computer or smartphone implementation, the power supply 808 can include a battery, solar array, or other portable power source used to power the electrical components of the electronic device. In a non-portable device implementation, the power supply 808 can include a power converter to convert an external voltage supply to a voltage level appropriate for the components of the electronic device 100. The user interface 812 includes one or more components manipulated by the user to provide user input to the electronic device 100, such as a touchscreen 814, a mouse, a keyboard, a microphone 816, various buttons or switches, and various haptic actuators 818. The set 810 of non-image sensors can include any of a variety of sensors used to provide non-image context or state of the electronic device 100. Examples of such sensors include a gyroscope 820, a magnetometer 822, an accelerometer 824, and an ambient light sensor 826. The non-image sensors further can include various wireless reception or transmission based sensors, such as a GPS receiver 828, a wireless local area network (WLAN) interface 830, a cellular interface 832, a peer-to-peer (P2P) wireless interface 834, and a near field communications (NFC) interface 836. The non-image sensors also can include user input components of the user interface 812, such as the touchscreen 814 or the microphone 816.

The electronic device 100 further has access to various datastores storing information or metadata used in conjunction with its image processing, location mapping, and location-utilization processes. These datastores can include a 2D feature datastore 838 to store metadata for 2D spatial features identified from imagery captured by the imaging cameras of the electronic device 100 and a 3D spatial feature datastore 840 to store metadata for 3D features identified from depth sensing for the 2D spatial features using multi-view analysis or modulated light-based depth sensing. The metadata stored for the 2D and 3D features can include, for example, timestamps for synchronization purposes, image identifiers of the images in which the spatial features were identified, identifiers of the capture device used, calibration information, and the like. This metadata further can include non-image sensor data that was contemporaneously with the image containing the identified spatial feature, such as GPS, wife, or other radio information, time-of-day information, weather condition information (which affects the lighting), and the like. The datastores further can include a SLAM/AR datastore 842 that stores SLAM-based information, such as mapping information for areas of the local environment 112 (FIG. 1) already explored by the electronic device 100, or AR information, such as CAD-based representations of the relative locations of objects of interest in the local environment 112. The datastores may be local to the electronic device 100, such as on a hard drive, solid state memory, or removable storage medium (not shown), the datastores may be remotely located and accessible via, for example, one or more of the wireless interfaces of the electronic device 100, or the datastores may be implemented as a combination of local and remote data storage.

In the depicted implementation, the processing system 800 employs two processors: the 2D processor 802 configured to efficiently identify 2D spatial features from visible-light imagery and depth sensor imagery captured by the imaging cameras of the electronic device 100; and the application processor 804 configured to efficiently identify 3D spatial features from the 2D spatial features and to efficiently provide location-based functionality, such as visual odometry or other SLAM functionality, AR functionality, and the like. However, in other embodiments, the described functionality of the 2D processor 802 and the application processor 804 may be implemented in a single processor, or more than two processors together may implement the described functionality. The 2D processor 802 can be implemented as, for example, a single-core or multiple-core graphics processing unit (GPU) and the application processor 804 can be implemented as, for example, a GPU or a single-core or multiple-core central processing unit (CPU).

The 2D processor 802 is coupled to the wide-angle imaging camera 114, the narrow-angle imaging camera 116, and the user-facing imaging camera 118 so as to receive image data captured by the imaging cameras in one or more pixel row buffers 844. In one embodiment, the 2D processor 802 includes an interface and a pixel row buffer 844 for each imaging camera so as to be able to receive image data from each imaging camera in parallel. In another embodiment, the 2D processor 802 includes a single interface and a pixel row buffer 844 and thus the 2D processor 802 multiplexes between the imaging cameras. The pixel row buffer 844 can include storage sufficient for one or more rows of pixels (up to a full frame buffer) from the images captured by the corresponding imaging camera. To illustrate, one or more of the imaging cameras may include rolling shutter imaging cameras whereby the image sensor of the imaging camera is scanned one row at a time, or a subset of rows at a time. As each row or row subset is scanned, its pixel data is temporarily buffered at the pixel row buffer 844. The buffered rows of pixels then may be transferred to a larger storage area, such as a separate frame buffer (not shown) for full frame processing.

The 2D processor 802 is configured to process the captured image data from the imaging cameras to identify 2D spatial features present in the image data. In some embodiments, the 2D processor 802 implements a hardware configuration specifically designed for this task. In other embodiments, the 2D processor 802 includes a more general processor architecture that provides the 2D spatial feature detection through execution of a software program configured to implement the 2D spatial feature detection process. The 2D processor 802 also may implement a combination of specialized hardware and specialized software for this purpose. As described above, any of a variety of well-known 2D spatial feature detection or extraction algorithms may be implemented by the 2D processor 802. The 2D processor 802 stores metadata and other information pertaining to the identified 2D spatial features to the 2D feature datastore 838.

The 2D processor 802, in one embodiment, is configured to analyze imagery captured by the user-facing imaging camera 118 to track the current position/orientation of the user's head using any of a variety of well-known head tracking algorithms. In the depicted example, the 2D processor 802 provides the head tracking information to the display controller 806, which in turn is configured to adjust the displayed imagery to react to changes in the user's view perspective as reflected in changes in position/orientation of the user's head. In another embodiment, the 2D processor 802 provides the head tracking information to the application processor 804, which in turn modifies the display data to reflect updated view perspectives before the display data is provided to the display controller 806.

The 2D processor 802 also acts as a controller that operates the modulated light projector 119 in its use in determining depth data for spatial features identified in the captured imagery of the local environment 112. In certain conditions, such as relatively bright settings (as sensed using the ambient light sensor 826), the 2D processor 802 may use multiview image analysis of imagery concurrently captured by the wide-angle imaging camera 114 and the narrow-angle imaging camera 116 to determine depth data for spatial features present in the captured imagery. In other conditions, such as relatively low lighting conditions, the 2D processor 802 may switch to the use of the depth sensor 120 (FIG. 1) to determine this depth data. In other embodiments, the processing system 800 implements a controller (not shown) separate from the 2D processor 802 to control the operation of the modulated light projector 119.

As described above, the depth sensor 120 relies on the projection of a modulated light pattern by the modulated light projector 119 into the local environment and on the capture of the reflection of the modulated light pattern therefrom by one or more of the imaging cameras. Thus, the 2D processor 802 may use one or both of the forward-facing imaging cameras 114 and 116 to capture the reflection of a projection of the modulated light pattern and process the resulting imagery of the reflected modulated light pattern to determine the depths of corresponding spatial features represented in the reflected modulated light pattern. To match a depth reading with a corresponding 2D spatial feature, the 2D processor 802 can perform a 2D spatial feature analysis on the depth imagery to determine a 2D spatial feature and its relative depth, and then attempt to match the 2D spatial feature to a corresponding spatial feature identified in the visual-light imagery captured at or near the same time as the reflected modulated light imagery was captured. In another embodiment, the 2D processor 802 can capture a visible-light image, and quickly thereafter control the modulated light projector 119 to project a modulated light pattern and capture a reflected modulated light image. The 2D processor 802 then can develop a depth map for the visible-light image from the reflected modulated light image as they effectively represent the same scene with the same spatial features at the same coordinates due to the contemporaneous capture of the visible-light image and the reflected modulated light image.

While effective in aiding the sensing of relative depths of spatial features present in captured imagery, the projection of the modulated light pattern can interfere with other operations of the electronic device 100. For one, while the modulated light projector 119 can be configured to project an infrared or near-infrared light pattern, the reflection of this infrared or near-infrared light can introduce interference into the visible-light imagery captured by the imaging cameras should they happen to activate their shutters while the modulated light pattern is being projected. This interference can both detract from the user's viewing experience of the captured visible-light imagery, as well as negatively impact the accuracy or efficacy of the image processing performed by the 2D processor 802. Moreover, the activation of the modulated light projector 119 can consume a significant amount of power, which can impact the run time of the electronic device 100 between battery recharges.

The application processor 804 is configured to identify 3D spatial features represented in the captured imagery using the 2D spatial features represented in the 2D feature datastore 838 and using non-image sensor information from the set 810 of non-image sensors. As with the 2D processor 802, the application processor 804 may be configured to perform this process through a specialized hardware configuration, through execution of software configured for this process, or a combination of specialized hardware and software. Metadata and other information for the identified 3D spatial features is stored in the 3D feature datastore 840. A 2D-to-3D spatial feature extraction process is described below with reference to FIG. 9.

The application processor 804 further is configured to provide SLAM, AR, VR, and other location-based functionality using 3D spatial features represented in the 3D feature datastore 840 and using the current context of the electronic device 100 as represented by non-image sensor data. The current context can include explicit or implicit user input obtained from, for example, the user interface 812 or via an analysis of user interactions. This functionality can include determining the current relative position/orientation of the electronic device 100 based on a visual odometry process that uses the 3D spatial features and various location-related non-image sensor data, such as a 6DoF reading from the gyroscope 820, a dead-reckoning history maintained using the accelerometer 824, a coarse absolute positional indicator determined using the GPS receiver 828 or determined using radio telemetry via the cellular interface 832, and the like. Similarly, the application processor 804 can use a history of positions/orientations of the electronic device 100 and a history of spatial features observed in those positions/orientations to create a map of the local environment 112.

The location-based functionality provided by the application processor 804 further can include AR-related or VR-related functionality that includes identifying and accessing from the SLAM/AR datastore 842 graphical information to be provided as a graphical overlay on the display 108 based on the current position/orientation determined by the application processor 804. This graphical overlay can be provided in association with imagery captured by the imaging cameras in the current position/orientation for display at the display 108 via the display controller 806. The display controller 806 operates to control the display 108 (FIG. 1) to display imagery represented by display data received from the application processor 804. Further, in some embodiments, the display controller 806 can receive head tracking information from the 2D processor 802 and adjust the view perspective of the imagery being displayed based on the user head position or eye position represented in the received head tracking information.

In a conventional 2D spatial feature detection application, an entire image is captured and then buffered at a frame buffer before a GPU or other processor initiates spatial feature extraction for the image. This approach can introduce a significant delay or lag in the spatial feature detection, and thus introduce a significant delay or lag in position/orientation detection, due to the delay incurred in transferring the image data to the frame buffer in preparation for its access by the GPU. To reduce or eliminate this lag, in some embodiments the 2D processor 802 is configured to perform 2D spatial feature extraction as captured image data is streamed to the 2D processor from a corresponding imaging camera. As the pixel row buffer 844 receives a subset of one or more pixel rows from the imaging camera, the 2D processor 802 processes the image portion represented by the subset of buffered pixels to identify 2D spatial features present in the image portion. The 2D processor 802 then may stream 2D spatial features to the 2D feature datastore 838, or directly to an input of the application processor 804, as they are identified from the image portion. As 2D spatial features are identified as the image data is streamed in, and as the identified 2D spatial features are streamed to the application processor 804 as they are identified, the 2D spatial feature detection process and the 3D spatial feature detection process can proceed at a faster rate compared to conventional image processing techniques that rely on whole image analysis.

Figure 9:
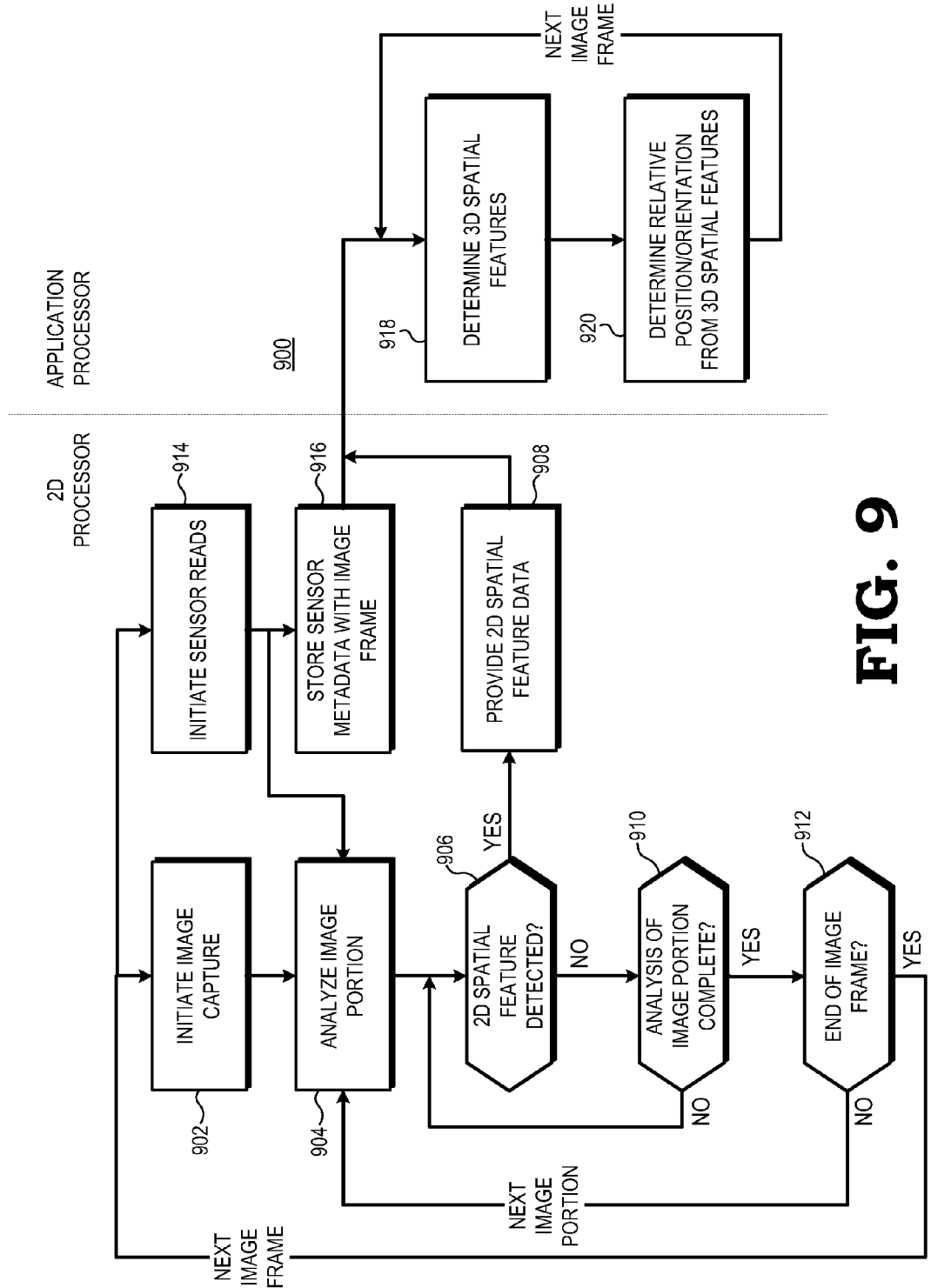
FIG. 9 is as flow diagram illustrating an operation of the processing system of FIG. 8 for 2D and 3D spatial feature extraction in accordance with at least one embodiment of the present disclosure.

FIG. 9 illustrates an example method 900 for 2D and 3D spatial feature extraction using the two-processor architecture of processing system 800 in accordance with at least one embodiment. An iteration of method 900 starts with the initiation of the capture of an image by one of the forward-facing imaging cameras 114 and 116 at block 902. At block 904, the 2D processor 802 scans a portion of the image being captured at the image sensor of the imaging camera into the pixel row buffer 844 and analyzes the image portion from the pixel row buffer 844 to identify any 2D spatial features present in the image portion. In response to detecting a 2D feature (block 906), the 2D processor 802 provides 2D spatial feature data representing the 2D feature for storage in the 2D feature datastore 838 at block 908. This 2D spatial feature data can include, for example, a spatial feature identifier, an indicator of the image in which the spatial feature was found or a time stamp associated with such image, an indicator of a position of the spatial feature within the image, an indicator of the type of spatial feature (e.g., edge, corner, etc.), and the like. The 2D processor 802 repeats the process of blocks 904, 906, and 908 until spatial feature extraction for the image portion is complete (block 910), at which point the method 900 returns to block 904, whereupon the next image portion is scanned from the image sensor of the imaging camera to the pixel row buffer 844 and the 2D spatial feature extraction process of blocks 904-910 repeats for this next image portion. When 2D spatial feature extraction of the last image portion of the image has been completed (block 912), the method 900 returns to block 902 and the process is repeated for the next image captured by an imaging camera of the electronic device 100.

Contemporaneously with the image capture and analysis process of blocks 902-912, the 2D processor 802 determines a current context of the electronic device 100 that is to be associated with the captured image. To this end, at block 914 the 2D processor 802 initiates the reading of one or more of the non-image sensors and uses the resulting non-image sensor data to specify one or more parameters of the current context of the electronic device 100. This can include, for example, specifying the 6DoF orientation of the electronic device 100 at the time the image was captured at block 902, specifying the ambient light incident on the electronic device 100 at this time, specifying a received signal strength indication (RSSI) for cellular signaling, specifying GPS coordinates of the electronic device 100 at this time, and the like. At block 916, the 2D processor 802 provides this current context information for storage in the 2D feature datastore as metadata associated with the 2D spatial features identified in the concurrently captured image. The current context capture process of blocks 914 and 916 then may repeat for the next image capture cycle.

As noted, in some embodiments, the 2D processor 802 streams the 2D spatial features and their associated context metadata to the application processor 804 as the 2D spatial features are identified. Accordingly, as 2D spatial feature data and metadata for a 2D spatial feature is received, at block 918 the application processor 804 converts the 2D spatial feature to a 3D spatial feature by determining the current depth of the 2D spatial feature. As noted, where two concurrently captured images are available, the depth of a spatial feature may be determined through multiview analysis of the two images. In this case, the application processor 804 correlates 2D spatial features from the two frames to identify a set of 2D spatial features that likely represent the same spatial feature and then determines the depth of the 2D spatial feature based on the parallax exhibited between the positions of the spatial feature between the two images. In instances where two concurrently captured images are not available, the application processor 804 can determine the current depth of the received 2D spatial feature based on the depth data concurrently captured by the depth sensor 120.

With the generation of the 3D spatial feature, at block 920 the application processor 804 may attempt to determine the current position/orientation of the electronic device 100 through the application of a visual odometry algorithm to this 3D spatial feature. In some instances, the 3D spatial feature, by itself, may not be sufficiently distinct so as to allow an accurate determination of the current position/orientation. Accordingly, the electronic device 100 may buffer 3D spatial feature data representing multiple contemporaneous 3D spatial features and then attempt to determine the current position/orientation from these multiple 3D spatial features.

In the approach described above, the application processor 804 may be able to identify the current position/orientation with sufficient granularity using one or a few 3D spatial features. As each 3D spatial feature can be determined shortly after the corresponding 2D spatial feature is identified, the application processor 804 can begin the process of determining the current position/orientation even before the 2D processor 802 has completed the capture and processing of the image from the imaging camera. This ability to rapidly determine the current position/orientation can translate to improved location-based functionality. To illustrate, as the current position/orientation can be identified quicker than a conventional approach which requires first filling the frame buffer, AR graphical overlay information may be accessed and displayed more rapidly, which can leads to less jerkiness and artifacts in the AR-enhanced imagery displayed at the electronic device 100.

FIGS. 10-13 illustrate example techniques for generating and using 3D feature descriptors for localization, mapping, object identification and the like. For ease of illustration, these techniques are described in the example context of the electronic device 100 described above with respect to FIGS. 1-9. As noted above, the electronic device 100 captures images of the surrounding environment using one or more of imaging cameras 114, 116, 118 (FIG. 4), and from these captured images extracts 2D feature descriptors that describe objects or other points of interest reflected in the captured images. Leveraging the fact that the same object may be captured in different images from different camera poses (e.g., different observation directions), the electronic device 100 can collect 2D feature descriptors of the same object from these different camera poses into a 3D feature descriptor for the object.

Each 2D feature descriptor may be indexed, identified, or otherwise associated with the camera pose within the 3D feature descriptor. Further, in some embodiments, the 2D feature descriptors may be normalized based on one or more aspects of the camera pose (such as normalized to a fixed observation distance from the subject object). With the 2D feature descriptors organized by one or more camera pose parameters, the 3D descriptor can be used to verify that a subsequently observed 2D feature descriptor represents the same object by comparing this subsequently-observed 2D feature descriptor with one or more 2D feature descriptors in the 3D feature descriptor that have a camera pose that most closely matches the camera pose associated with the subsequently-observed 2D feature descriptor. This matching process can be used, for example, to verify a position or orientation of the electronic device 100 by comparing 2D features descriptors extracted from a captured image with 2D feature descriptors from one or more 3D feature descriptors of a 3D feature map previously generated for the local environment. As another example, this matching process can be used to verify that an imaged object matches a previously-imaged object.

The camera pose associated with each 2D feature descriptor incorporated into a 3D feature descriptor includes at least the observation direction of the imaging camera with respect to the imaged object at the time of capture of the image of the object from which the 2D feature descriptor is described. To illustrate using a simple example, if an imaging camera of the electronic device 100 is pointing south toward the object when an image is captured by the imaging camera, all 2D features descriptors extracted from the image for the object can be said to have a south-facing observation direction relative to the object. This observation direction can include one or more degrees of rotation, such as: left/right rotation (i.e., yaw angle), forward/backward tilt (i.e., pitch angle), and side-to-side pivot (i.e., roll angle), all relative to a fixed gravitational reference or other relative or absolute reference. The camera pose additionally can include one or more other position- or location-based parameters, such as distance from the observed object, elevation (absolute or relative) or a 3D location identifier, or other contextual parameters, such as time of day, ambient light conditions, and the like. The parameters of the camera pose for a captured image can be determined via, for example, one or more sensors of the set 810 of non-image sensors (FIG. 8) of the electronic device 100, via hints or assumptions about the object, or hints or assumptions about other structures extracted from captured images, or a combination thereof.

Figure 10:
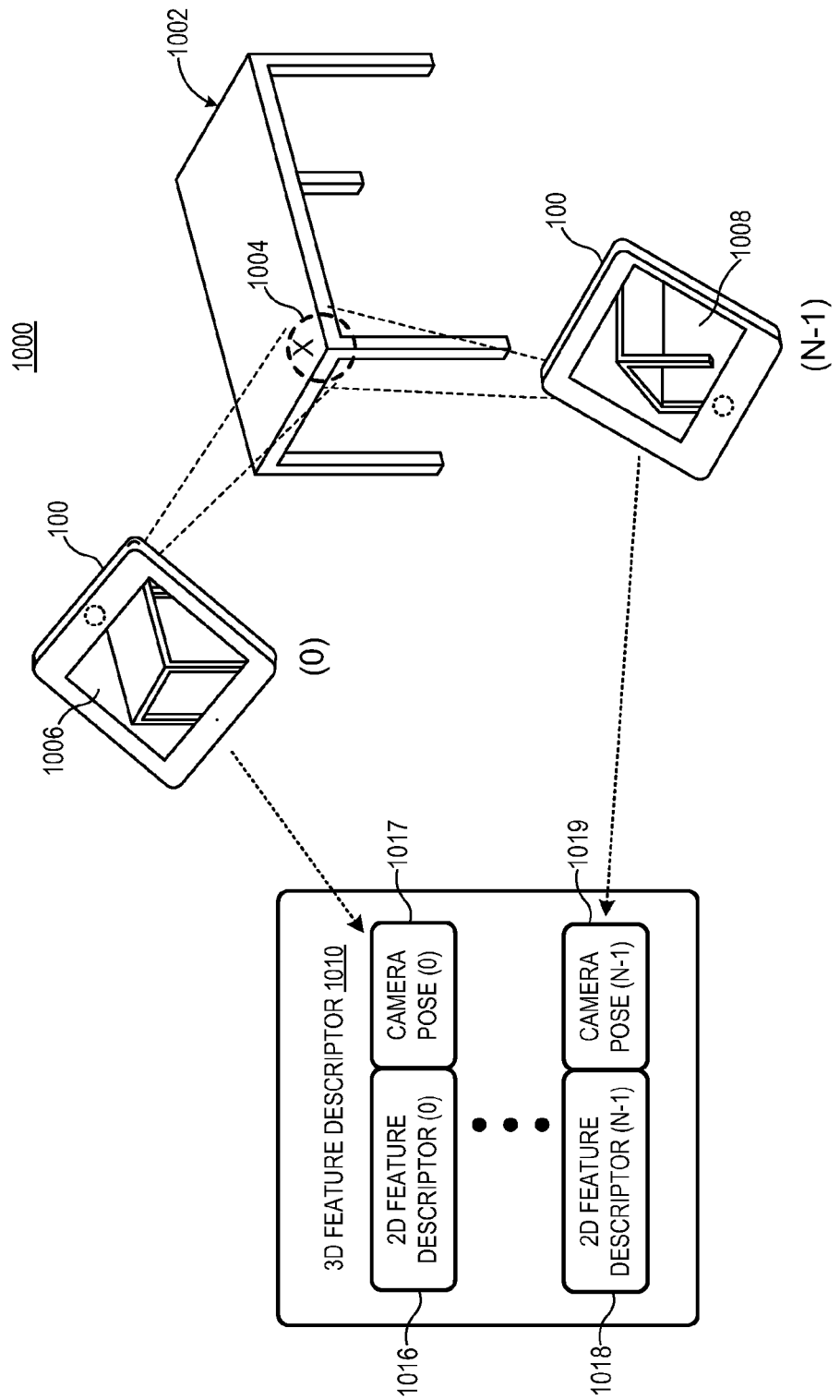
FIG. 10 is a diagram illustrating a 3D feature descriptor based on images of an object captured from different camera poses in accordance with at least one embodiment of the present disclosure.

FIG. 10 illustrates an example of the 3D feature descriptor generation process in accordance with at least one embodiment. In the depicted example, a local environment 1000 of the electronic device 100 includes a table 1002 (an example of an object). The table 1002 includes a corner 1004 (an example of a point of interest, or an object). Over time, images of the corner 1004 of the table 1002 may be captured by imaging cameras of the electronic device 100 from any of a variety of camera poses. To illustrate, the electronic device 100 may be manipulated to different poses relative to the table 1002 such that N images of the corner 1004 of the table 1002 are captured by the electronic device 100, with each of the N images being captured in a different pose of the electronic device 100. As depicted, one image 1006 is captured with the electronic device 100 in corresponding pose (denoted "(0)" in FIG. 10) relative to the corner 1004, and the another image 1008 is captured with the electronic device 100 in a different corresponding pose (denoted "(N−1)" in FIG. 10) relative to the corner 1004.

In response to capturing the image 1006, the electronic device 100 extracts the 2D features observable from the image 1006. In this example, the corner 1004 has not been observed before by the electronic device 100, and thus the electronic device 100 instantiates a 3D feature descriptor 1010 for the corner 1004 and stores, in the 3D feature descriptor 1010, a 2D feature descriptor 1016 representing a 2D feature for the corner 1004 as extracted from the image 1006. Note that more than one 2D feature descriptor may be extracted for a single corner: a first 2D feature descriptor may be for the point of the corner, a second 2D feature descriptor may be for the captured portion of the longer edge, a third 2D feature descriptor may be for the captured portion of the shorter edge, and a fourth 2D feature descriptor may be for the captured portion of the planar surface of the tabletop. The entry of the 3D feature descriptor 1010 that stores the 2D feature descriptor 1016 also can include, or be associated with, a pose field 1017 that stores a representation of the camera pose when the image 1006 was taken (that is, pose (0)). This representation can include, for example, a representation of the observation direction of the electronic device 100 at the time of image capture, which may include, for example, one or more values indicative of the positions of the electronic device 100 about one or more rotational axes, an absolute or relative elevation, a distance from the corner 1004, and the like as obtained through one or more non-image sensors.

Similarly, the electronic device 100 extracts the 2D features from the image 1008, and, in response to identifying a 2D feature from image 1008 as representing the corner 1004, stores a 2D feature descriptor 1018 representative of this 2D feature in the 3D feature descriptor 1010. The entry storing the 2D feature descriptor 1018 also can include, or be associated with, a pose field 1019 that stores a representation of the camera pose when the image 1008 was taken (that is, pose (N−1)). The same process can be performed for other images captured by the electronic device 100 and which are determined to include the corner 1004 of the table 1002 to further populate the 3D feature descriptor 1010 with 2D feature descriptors of the corner 1004 from different observation directions and other different contexts.

The 3D feature descriptor 1010 can implement any of a variety or combination of data structures stored at a storage device of the electronic device 100, or in an external device connected to the electronic device 100 via a wireless or wired network. The 2D feature descriptors can comprise any of a variety or combination of feature descriptors that may be used to describe or identify a 2D feature in an image. Examples of such descriptors include Scale-Invariant Feature Transform (SIFT)-based descriptors, Speeded-Up Robust Features (SURF) descriptors, Gray Level Patch descriptors, Gradient Location and Orientation Histogram (GLOH) descriptors, Zernike Moment descriptors, Binary Robust Independent Elementary Features (BREIF), Oriented BRISK (ORB), Binary Robust Invariant Scalable Keypoints (BRISK), Difference of Gaussians (DOG), Fast Retina Keypoint (FREAK), and the like. The pose field associated with each 2D feature descriptor (e.g., pose fields 1017 and 1019) can include any of a variety of data formats that may be used to represent various pose parameters, such as an ordered list of values, a table of values, and the like.

It will be appreciated that distance between the electronic device 100 and the observed object may differ significantly from image to image. Accordingly, to introduce distance independence to the 3D feature descriptor, in some embodiments the 2D feature descriptors are normalized to a fixed scale, or fixed observation distance, before being associated with a corresponding 3D feature descriptor. This distance independence facilitates matching of 2D feature descriptors that may have been taken at different distances from the observed object. In other embodiments, the pose field associated with each 2D feature descriptor includes a representation of the distance between the observed object and the imaging camera, thereby allowing subsequent scaling of the 2D feature descriptor for comparison purposes. This representation of the distance for a detected 2D feature may be obtained using the depth sensor 120 (FIG. 1) or a multiview analysis technique, as described above.

The 3D feature descriptor 1010, after initialized with one or more 2D feature descriptors, may be subsequently utilized for any of a variety of machine vision tasks. In some embodiments, the 3D feature descriptor 1010 may be added to a 3D map of the local environment 1000. This 3D map may then be used by the electronic device 100 or another machine-vision enabled device for localization, whereby the electronic device 100 estimates its location, predicts what surfaces or other objects should be observable from its estimated location and its pose, captures one or more images, and then compares the 2D features extracted from the captured images with the 2D feature descriptors of the 3D feature descriptors for the objects expected to be observable to verify its estimated position or pose in a previously-visited environment. This 3D map also may be used, for example, for object recognition. In this approach, upon encountering a previously-encountered object, the electronic device 100 can extract 2D features from an image captured from the object in a given pose, and then compare the extracted 2D features with the feature descriptors of one or more 3D feature descriptors to identify the 3D feature descriptor that most closely matches the extracted 2D features, and thus identify the object associated with this identified 3D feature descriptor.

Figure 11:
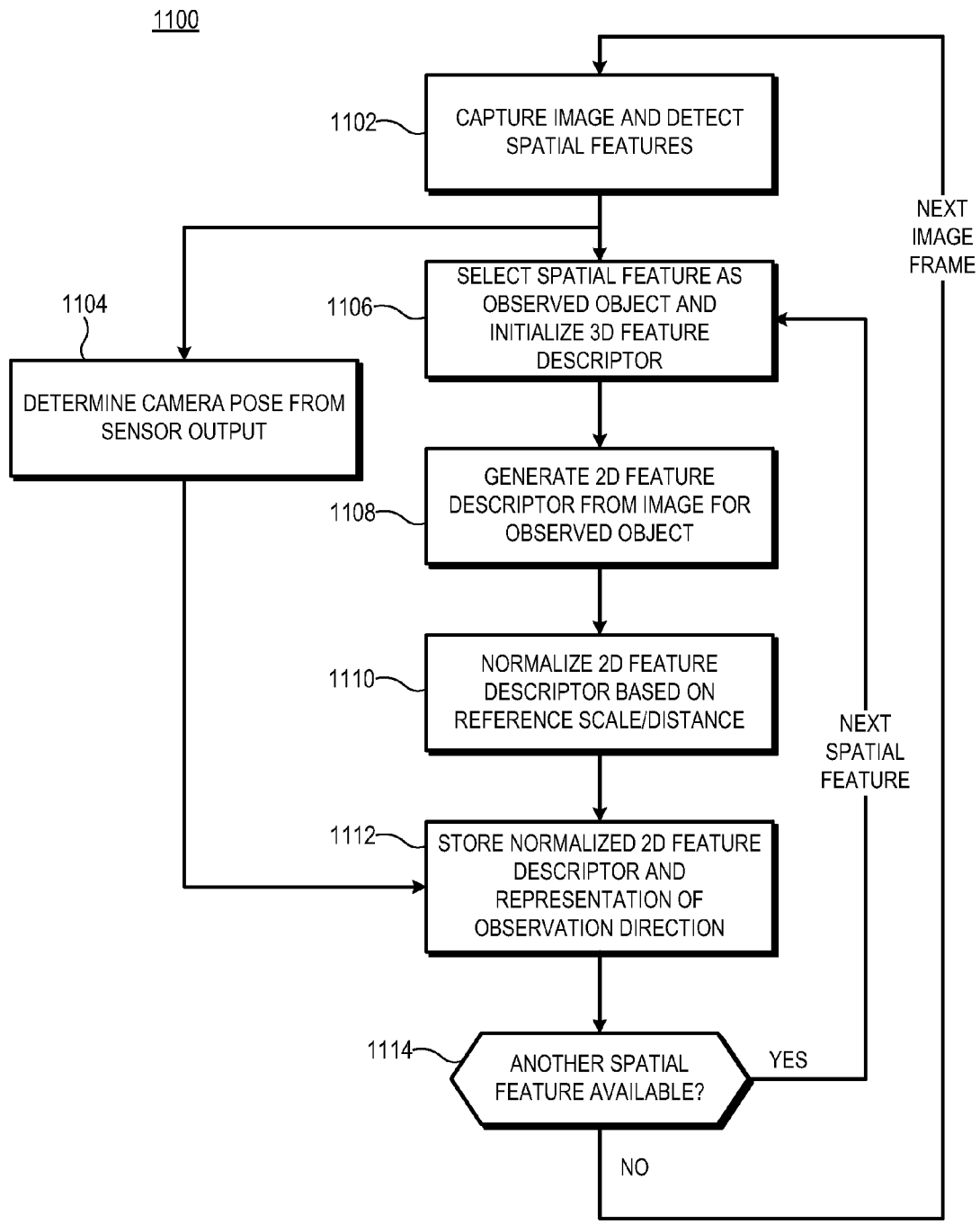
FIG. 11 is a flow diagram illustrating a method for generating a 3D feature descriptor of an object from 2D feature descriptors extracted from different camera poses in accordance with at least one embodiment of the present disclosure.

FIG. 11 illustrates an example method 1100 for generating a 3D feature descriptor of an object from 2D feature descriptors in accordance with at least one embodiment of the present disclosure. The method 1100 is described in the example context of FIG. 10 and with reference to the processing system 800 of FIG. 8 for ease of illustration. Moreover, for the following it is assumed that the subject object has not been previously encountered by the electronic device 100 nor has it been previously cataloged as a 3D feature descriptor in a 3D map or other 3D object database. Accordingly, method 1100 illustrates a technique for initialization of a new 3D feature descriptor for the subject object by the electronic device 100. The method 1100 initiates at block 1102, whereby the electronic device 100 uses one of the imaging cameras 114, 116, 118 to capture an image of the local environment 1000 (FIG. 10). As a simplified example, only one image will be analyzed with respect to FIG. 11, but given that the electronic device 100 has three cameras it is possible to analyze three images with related local environment and pose information. The captured image data is buffered by the processing system 800 of the electronic device 100, and the 2D processor 802 analyzes the captured image data to identify various spatial features within the captured image. The 2D feature data generated from this process is stored at, for example, the 2D feature data store 838.

At block 1104, the application processor 804 determines the current camera pose (that is, the pose of the imaging camera at or around the time of capture of the image at block 1102). The current camera pose can include any of a variety of position parameters, orientation parameters, and other context parameters indicated by, or derived from, the set 810 of non-image sensors. Generally, the current camera pose includes an observation direction parameter that describes the observation direction of the camera, as either relative to an absolute frame of reference (e.g., relative to the cardinal points and gravitational direction) or to a relative frame of reference (e.g., relative to a previous orientation and position). For example, the processing system 800 may utilize a digital compass, the gyroscope 820, or the accelerometer 824 to determine the cardinal direction that the imaging camera is facing (e.g., 225 degrees, or southwest), a pitch of the imaging camera (e.g., −15 degrees relative to gravitational direction), and a roll of the imaging camera (e.g., +10 degrees left). While the observation direction may be determined from the set 810 of non-image sensors, in some embodiments, visual references are used to determine, or confirm, one or more aspects of the observation direction, such as though the use of nearby walls, a primary axis of the building, or other visual orientation indicator that may be represented in the captured image. To illustrate, the captured image may include a substantially straight and long spatial feature oriented normal to gravity as sensed by an accelerometer of the electronic device 100, and the 2D processor 802 may conclude this spatial feature is a corner of a wall (see FIG. 1) and thus establish the vertical reference from this spatial feature.

The current camera pose also may include additional position-related parameters, such as the elevation of the electronic device 100 relative to an absolute reference (such as altitude determined using, for example, an altimeter) or relative to a previous position or relative to the local environment 1000, or, more generally, an absolute or relative 3D location of the electronic device 100. Moreover, the current camera pose also can include a distance parameter that represents the distance between the electronic device 100 and the subject object. This distance parameter can be determined using, for example, the depth sensor 120 or a multiview analysis. Alternatively, if the electronic device 100 has a priori knowledge of the 3D position of the subject object and the 3D position of the electronic device 100 at the time of image capture, the electronic device 100 can derive this distance parameter based on the distance between these two 3D positions.

The current camera pose also can include non-location/position context parameters that may impact the calculation of the 2D spatial features from the captured image. These context parameters can include, for example, the ambient light condition at the time of image capture, time of day (which predicts the angle of the sun and possible shadows present in the captured image), current weather conditions, and the like.

In parallel with the determination of the current camera pose, the processing system 800 initiates the analysis of the captured image. Accordingly, at block 1106, the application processor 804 selects one of the spatial features present in the captured image as the object of interest for generation of a 3D feature descriptor and initializes a 3D feature descriptor for the subject object in, for example, the 3D feature datastore 840. At block 1108, the application processor 804 identifies those 2D spatial features from the captured image that are representative of the subject object and generates a 2D feature descriptor from one or more 2D spatial features so identified. As noted above, the 2D feature descriptor may be generated using any of a variety of feature description algorithms, such as SIFT, SURF, DOG, BRISK, ORB, FREAK, GLOH, and the like.

Depending on the manner in which the 2D feature descriptor is generated, the 2D feature descriptor may be dependent on one or more pose aspects, such as the distance between the subject object and the imaging camera, the light incident on the subject object at the time of image capture, and the like. These dependencies may make subsequent 2D feature descriptor comparisons more difficult. Accordingly, in some embodiments, at block 1110 the 2D feature descriptor 1010 is normalized to a reference parameter so as render parameter-independence in the resulting normalized 2D feature descriptor. To illustrate, the 2D feature descriptor may be scaled or otherwise normalized to reflect a specified reference distance. This reference distance may be configured based on the context of the object, such that objects observed in an indoor environment may be set for a reference distance of, for example, 1 meter, whereas an outdoor context may call for a reference distance of, for example, 10 meters. Other parameters, such as light intensity, color, and the like may be normalized to a corresponding reference or scale in a similar manner.

At block 1112, the normalized 2D feature descriptor and a representation of the observation direction of the imaging camera at time of image capture are stored to a corresponding entry of the 3D feature descriptor previously initialized at block 1106. In some embodiments, the 3D feature descriptor is implemented as an indexed table, whereby each table entry is indexed by a corresponding observation direction, and thus a 2D feature descriptor generated from an image having a particular observation direction is stored at the table entry associated with that observation direction. Further, the table entries may be indexed along multiple parameters, such as observation direction, distance, lighting, time of day, and the like. Further, in some embodiments, rather than normalizing the 2D feature descriptors based on distance, the distance at which the image was captured is used to further index the 2D feature descriptor within the 3D feature descriptor. Thus, the 3D feature descriptor can contain multiple 2D feature descriptors from multiple images taken from the same observation direction but at different distances from the object. This parameter-based indexing facilitates identification of potentially similar 2D features based on similar parameters, as described in greater detail below.

At block 1114, the processing system 800 determines whether the captured image includes another spatial feature of interest. If so, the process of blocks 1106, 1108, 1110, 1112, and 114 may be repeated for another spatial feature selected from the captured image so as to generate a 2D feature descriptor for inclusion in the 3D feature descriptor of a different object. If not, the method 1100 returns to block 1102, whereby the process of blocks 1102, 1104, 1106, 1108, 1110, 1112, and 114 may be repeated for one or more other image captures so as to further populate the 3D feature descriptor of the subject object with additional 2D feature descriptors taken with different cameras or in different camera poses with respect to the subject object. Accordingly, through iteration of the method 1100, the electronic device 100 can build up a 3D feature descriptor of an object (e.g., the corner 1004 of the table 1002) in the local environment 1000 from various observation directions, distances, elevations, orientations, lighting conditions, and the like. This robust description of the object in different contexts as provided by a 3D feature descriptor generated in this manner facilitates various 3D machine-vision tasks, such as location confirmation and object identification by referencing the subject object and its corresponding 3D feature descriptor.

Figure 12:
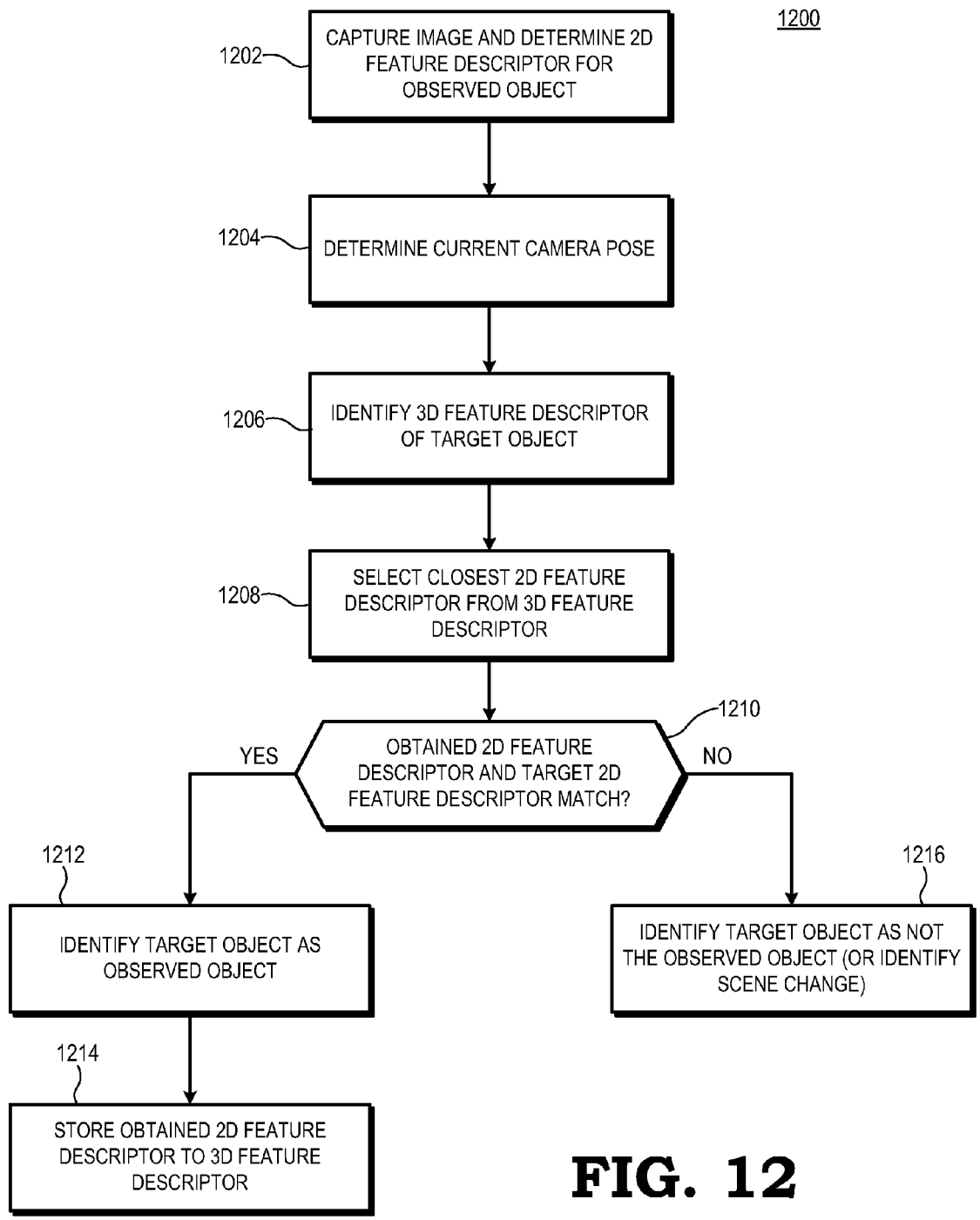
FIG. 12 is a flow diagram illustrating a method for further populating a 3D feature descriptor for an object based on newly captured images of the object in accordance with at least one embodiment of the present disclosure.

FIG. 12 illustrates an example method 1200 for further populating a 3D feature descriptor for an object based on newly captured images of the object in accordance with at least one embodiment of the present disclosure. The method 1200 is described in the example context of FIG. 10 and with reference to the processing system 800 of FIG. 8 for ease of illustration. For the following, it is assumed that a pre-existing 3D feature descriptor has been generated for a subject object using, for example, the method 1100 of FIG. 11. The method 1200 initiates at block 1202, whereby the electronic device 100 captures an image of the local environment 1000 and the processing system 800 analyzes the captured image to determine a 2D feature descriptor for a spatial feature of interest in the captured image (hereinafter, "the observed 2D feature descriptor"). To facilitate a straightforward explanation, only one 2D feature descriptor is being analyzed. As mentioned previously, though, a single spatial feature may have multiple 2D feature descriptors. Also, a single image may have multiple spatial features of interest. At block 1204, the processing system 800 determines the current camera pose of the electronic device at or near the time of capture of the image at block 1202.

At block 1206, the processing system 800 identifies a 3D feature descriptor that is predicted to represent the observed object represented by the 2D feature descriptor. In some embodiments, the processing system 800 uses the current camera pose to predict an object that should be visible from the current camera pose and then select that object's 3D feature descriptor from a 3D map or other 3D feature datastore. In other embodiments, the processing system 800 has a priori knowledge of the subject object, such as when a user manually inputs or identifies an object through a user interface and then begins capturing images of the object from different poses.

At block 1208, the processing system 800 selects a 2D feature descriptor of the identified 3D feature descriptor (hereinafter, "the target 2D feature descriptor") that most closely matches the observed 2D feature descriptor. In some embodiments, a match is identified based on a similarity between the observation direction associated with the observed 2D feature descriptor and the observation direction associated with the target 2D feature descriptor in the selected 3D feature descriptor. To illustrate, in an example implementation whereby the 2D feature descriptors are indexed by cardinal direction in the 3D feature descriptor, for an observed 2D feature descriptor having an observation direction of say, 15 degrees (or roughly North by North-West), the processing system 800 may access the stored 2D feature descriptor having an observation direction of 15 degrees, or an observation direction closest thereto while being within a maximum deviation threshold of, for example, +/−45 degrees.

In some instances, the 2D feature descriptors of the 3D feature descriptor may be indexed by more than one parameter. To illustrate, 2D feature descriptors may be indexed based on cardinal direction and distance, and thus if two 2D feature descriptors have a cardinal direction are equally close to the cardinal direction associated with the observed 2D feature descriptor, the processing system 800 would then select as the target 2D feature descriptor that 2D feature descriptor having a distance parameter that most closely matches the distance parameter of the observed 2D feature descriptor.

At block 1210, the processing system 800 compares the observed 2D feature descriptor to the target 2D feature descriptor to determine whether they match. A match between these two 2D feature descriptors may depend on the composition of the 2D feature descriptors. To illustrate, histogram-based 2D feature descriptors may be considered to be a match when, for example, the Euclidian distance between the two 2D feature descriptors is less than a defined threshold. Calculation of the hamming distance, which is readily implementable in hardware, is another technique that may be used to determine the difference between two binary descriptors. A variety of similarity metrics such as dot products, or Mahalanobis distance (which is scale-invariant) also could be used to compare feature descriptor vectors or strings. Further, because certain parameters of the two 2D feature descriptors may differ (e.g., the 2D feature descriptors may have been extracted from image taken under different lighting conditions or at different distances from the object), unless already normalized, one or both of the 2D feature descriptors may need to be normalized to a defined reference parameter before the match comparison can proceed.

In the event that a match (to a predetermined level of certainty) between the 2D feature descriptors is detected, at block 1212 the processing system 800 identifies the observed object as the target object observed from the same or similar direction. Accordingly, with the observed object so identified, at block 1214 the processing system 800 can bolster the information stored in the 3D feature descriptor by adding the observed 2D feature descriptor to the 3D feature descriptor. Returning to block 1210, if the processing system 800 determines that the 2D feature descriptors do not sufficiently match, at block 1216, the processing system can identify the target object and the observed object as being different objects. In response to this determination, the processing system 800 can either terminate the object matching process for the observed 2D feature descriptor, or the method 1200 may return to block 1206 and the processing system 800 may select a different target object with a different 3D feature descriptor and repeat the process of blocks 1206, 1208, 1210, 1212, 1214, and 1216 with this newly-selected 3D feature descriptor.

Alternatively, rather than determining that an insufficient match between the 2D feature descriptors indicates that the target object and the observed object are not the same object, the processing system 800 instead may tentatively identify the mismatch a result of a scene change, and thus attempt to rematch the observed object and the target object using a different observed 2D feature descriptor for the object from the same captured image by repeating method 1200 using this different observed 2D feature descriptor.

Figure 13:
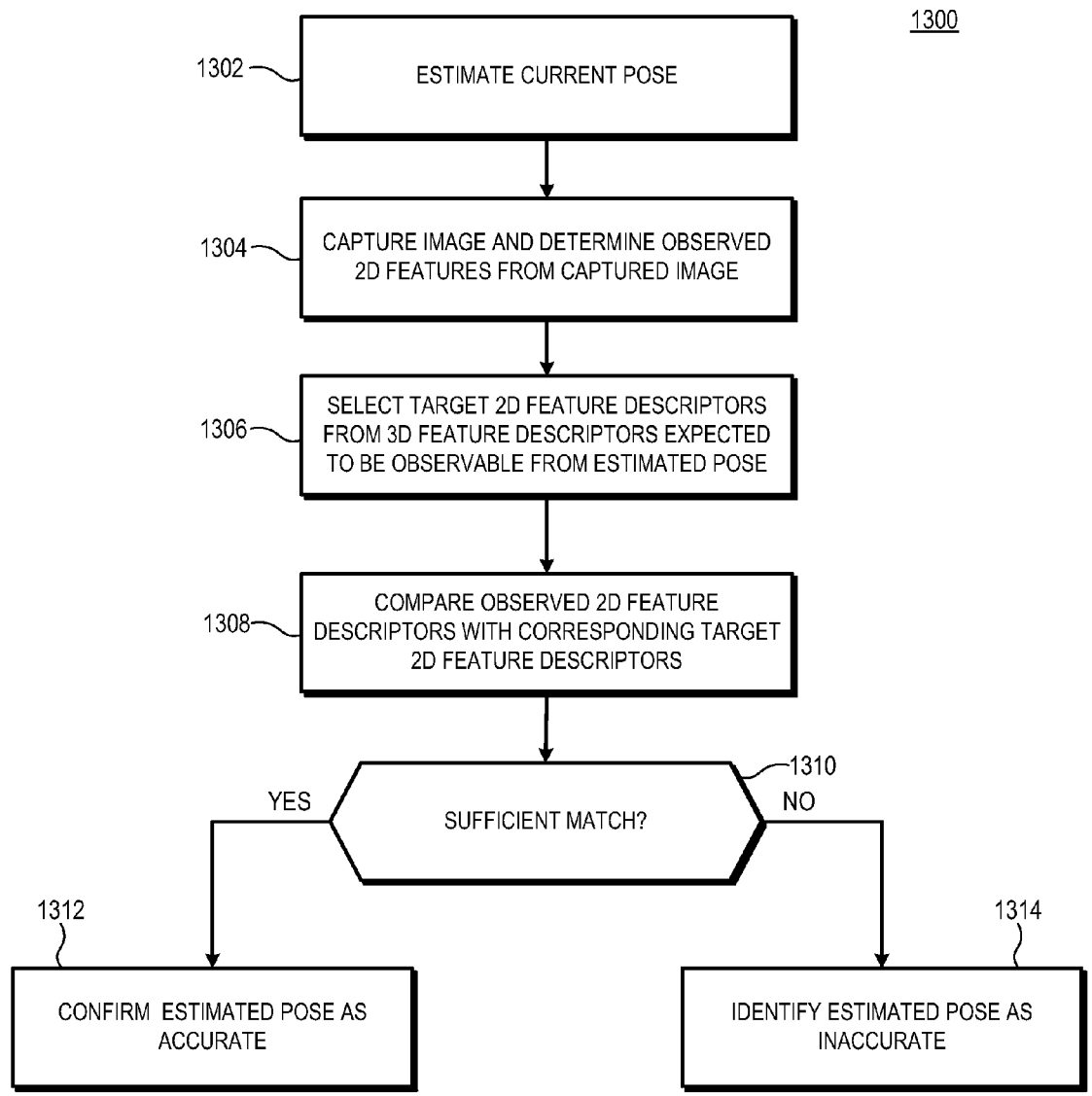
FIG. 13 is a flow diagram illustrating a method for verifying an estimated pose of an imaging camera using 3D feature descriptors in accordance with at least one embodiment of the present disclosure.

FIG. 13 illustrates an example method 1300 for verifying an estimated location/orientation of the electronic device 100 using a 3D feature descriptor in accordance with at least one embodiment of the present disclosure. The method 1300 is described in the example context of FIG. 10 and with reference to the processing system 800 of FIG. 8 for ease of illustration. For the following, it is assumed that a pre-existing 3D map of 3D feature descriptors has been generated in the manner described above. The method 1300 initiates at block 1302, whereby the electronic device 100 estimates its current pose in response to, for example, a desire to verify its relative or absolute location in the local environment or to identify an object present in the local environment 1000. As described above, the current (camera) pose, includes the observation direction of one or more imaging cameras, and further can include one or more position-based parameters (e.g., orientation, 3D position, elevation, distance from an object or reference point), one or more non-position context parameters (e.g., time of day, ambient light), or a combination thereof. These parameters can be determined from the set 810 of non-image sensors, determined from reference features present in one or more captured images, and the like.

At block 1304, the processing system 800 uses a selected imaging camera to capture an image of the local environment, and from this captured image extracts a set of one or more 2D feature descriptors from spatial features identified in the captured image (hereinafter, "the observed 2D feature descriptors"). At block 1306, the processing system 800 uses the pose estimated at block 1302 to calculate, from a 3D map or other 3D feature database, a set of one or more 3D feature descriptors that should be visible from the estimated pose. From the 2D feature descriptors of this set of one or more 3D feature descriptors, the processing system 800 selects 2D feature descriptors having similar pose parameters as the set of observed 2D features (these selected 2D feature descriptors referred to herein as the "target 2D feature descriptors").

At block 1308, the processing system 800 compares each observed 2D feature descriptor with the closest target 2D feature descriptor (with "closest" being measured by similarity in pose parameters) to determine whether the two 2D feature descriptors match. As noted above, a "match" may be identified, for example, when the Euclidean distance between the target 2D feature descriptor and the corresponding observed 2D feature descriptor is less than a specified threshold. This match comparison may be repeated at another iteration of block 1308 for each target-observed 2D feature descriptor pairing from the corresponding sets of 2D feature descriptors.

If there is sufficient matching across enough 2D feature descriptors, then the processing system 800 can conclude that the estimated pose (block 1302) is accurate. It thus follows that if there is not sufficient matching across 2D feature descriptors, then the estimated pose is not accurate. Accordingly, after the 2D feature descriptors have been compared, at block 1310 the processing system 800 determines whether there is sufficient matching between the 2D feature descriptors to confirm the estimated pose. In some embodiments, there is sufficient matching when a sufficient number or proportion (e.g., 75%) of target-observed 2D feature descriptor pairs match. In other embodiments, the degree of matching instead may be calculated as an accumulation of the mismatch between 2D feature descriptor pairs (e.g., a sum of the Euclidean distances between the paired 2D feature descriptors), and if this sum, or average determined therefrom, is less than a defined threshold, then the processing system 800 may identify sufficient matching.

If there is sufficient matching among the 2D feature descriptor pairs, at block 1312 the processing system 800 confirms the estimated pose as accurate, and thus may use this information for locating the electronic device 100 within the local environment. Conversely, if there is insufficient matching among the 2D feature descriptor pairs, at block 1314 the processing system 800 identifies the estimated pose as inaccurate. In response, the processing system 800 may, for example, recalculate the estimated pose and attempt to verify this new estimated pose via another iteration of the method 1300. Alternatively, the processing system 800 may revert to a different technique for locating the electronic device 100, such as by using GPS location features, or by returning to a last known-good pose and recalibrating.

Much of the inventive functionality and many of the inventive principles described above are well suited for implementation with or in software programs or instructions and integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. In an electronic device comprising an imaging camera coupled to at least one processor and a datastore, a method comprising:
   determining, by the at least one processor, a first two-dimensional (2D) feature descriptor from a first image captured by an imaging camera in a first pose at a time of capture of the first image, the first pose including a first observation direction of the imaging camera; and
   storing, at the datastore, a 3D feature descriptor having a plurality of entries, each entry configured to store a corresponding 2D feature descriptor, and wherein a first entry of the plurality of entries stores the first 2D feature descriptor and a representation of the first pose of the imaging camera;
   wherein storing the 3D feature descriptor comprises indexing the first 2D feature descriptor in the plurality of entries of the 3D feature descriptor based on the first observation direction; and
   wherein the representation of the first pose further includes at least one of: a representation of a weather condition at the time of capture of the first image; and a representation of an ambient light condition at the time of capture of the first image.

2. An electronic device comprising:
an imaging camera to capture a first image;
a set of one or more sensors to determine a first pose of the imaging camera at a time of capture of the first image, the first pose including a first observation direction of the imaging camera;
a processor to determine and store a three-dimensional (3D) feature descriptor, the 3D feature descriptor having a plurality of entries, each entry configured to store a corresponding 2D feature descriptor, and wherein a first entry of the plurality of entries stores a first two-dimensional (2D) feature extracted from the first image and a representation of the first pose of the imaging camera, wherein the processor is to index the first 2D feature descriptor in the plurality of entries of the 3D feature descriptor based on the first observation direction; and
wherein the representation of the first pose further includes at least one of: a representation of a weather condition at the time of capture of the first image; and a representation of an ambient light condition at the time of capture of the first image.

3. The electronic device of claim 2, wherein:
the imaging camera further is to capture a second image;
the set of one or more sensors further is to determine a second pose of the imaging camera at a time of capture of the second image, the second pose including a second observation direction of the imaging camera; and
the 3D feature descriptor further includes a second entry of the plurality of entries to store a second 2D feature descriptor extracted from the second image and a representation of the second pose of the imaging camera.

4. The electronic device of claim 2, wherein:
the representation of the first pose further includes a representation of an orientation of the imaging camera at the time of capture of the first image.

5. The electronic device of claim 2, wherein:
the representation of the first pose further includes a representation of a distance of the electronic device from an object represented by the first 2D feature descriptor.

6. The electronic device of claim 5, wherein the processor is to index the first 2D feature descriptor in the plurality of entries of the 3D feature descriptor further based on the distance.

7. The electronic device of claim 2, wherein the processor further is to normalize the first 2D feature descriptor based on a specified reference distance.

8. The method of claim 1, further comprising:
determining a second 2D feature descriptor from a second image captured by the imaging camera in a second pose at a time of capture of the second image, the second pose including a second observation direction of the imaging camera; and
wherein storing the 3D feature descriptor includes storing the 3D feature descriptor with a second entry of the plurality of entries storing the second 2D feature descriptor and a representation of the second pose of the imaging camera.

9. The method of claim 1, wherein:
the representation of the first pose further includes a representation of an orientation of the imaging camera at the time of capture of the first image.

10. The method of claim 9, wherein:
the representation of the orientation of the imaging camera includes a representation of at least one of: yaw angle of the imaging camera; a pitch angle of the imaging camera; and a roll angle of the imaging camera.

11. The method of claim 10, further comprising:
determining a reference orientation based on sensor output from at least one of: an accelerometer; a gyroscope; a digital compass; and a magnetometer; and
wherein at least one of the yaw angle, the pitch angle, and the roll angle is relative to the reference orientation.

12. The method of claim 1, wherein:
the representation of the first pose further includes a representation of a distance of the electronic device from an object represented by the first 2D feature descriptor.

13. The method of claim 12, wherein storing the 3D feature descriptor further comprises:
indexing the first 2D feature descriptor in the plurality of entries of the 3D feature descriptor further based on the distance.

14. The method of claim 1, further comprising:
normalizing the first 2D feature descriptor based on a specified reference distance.

* * * * *